US006839872B2

(12) United States Patent
Kohda

(10) Patent No.: US 6,839,872 B2
(45) Date of Patent: Jan. 4, 2005

(54) MEDIA CONVERTER AND FAILURE DETECTION TECHNIQUE

(75) Inventor: Yoshimi Kohda, Tokyo (JP)

(73) Assignee: Allied Telesis Kabushiki Kaisha, Tokyo (JP)

(*) Notice: Subject to any disclaimer, the term of this patent is extended or adjusted under 35 U.S.C. 154(b) by 455 days.

(21) Appl. No.: 09/947,565

(22) Filed: Sep. 7, 2001

(65) Prior Publication Data

US 2002/0178411 A1 Nov. 28, 2002

(30) Foreign Application Priority Data

May 28, 2001 (JP) ........................................ 2001-158277
May 28, 2001 (JP) ........................................ 2001-158278

(51) Int. Cl.[7] ................................................ G01R 31/28
(52) U.S. Cl. ........................................ 714/712; 370/245
(58) Field of Search ........................... 714/712; 370/245

(56) References Cited

U.S. PATENT DOCUMENTS 5,832,236 A * 11/1998 Lee ............................ 709/249
6,088,051 A * 7/2000 Barraud ...................... 725/116
6,154,774 A * 11/2000 Furlong et al. ............. 709/224
6,204,948 B1 * 3/2001 Coffey et al. ............... 398/135
6,215,764 B1 * 4/2001 Wey et al. .................. 370/216
6,320,872 B1 * 11/2001 Asbjorn et al. ............. 370/466
6,320,874 B1 * 11/2001 Crump et al. ............... 370/466
6,364,535 B1 * 4/2002 Coffey ......................... 385/53
6,504,849 B1 * 1/2003 Wang et al. ................ 370/455
6,618,359 B1 * 9/2003 Chen et al. ................. 370/242

FOREIGN PATENT DOCUMENTS

JP 8-331126 12/1996

OTHER PUBLICATIONS

IEEE Standard 802.3, 1985, p. 24.*

* cited by examiner

*Primary Examiner*—Guy J. Lamarre
*Assistant Examiner*—John P. Trimmings
(74) *Attorney, Agent, or Firm*—McGinn & Gibb, PLLC

(57) ABSTRACT

A media converter allowing a test mode to be activated from cable side and allowing easy detection of a failure and failure location is disclosed. A media converter includes first and second physical-layer interfaces and a memory connected between the first and second physical-layer interfaces to temporarily storing received data. When a trigger signal has been received at one of the first and second physical-layer interfaces, a response signal to the trigger signal is sent from a corresponding physical-layer interface back to a source that transmitted the trigger signal. The trigger signal is one of a specified modulation link signal and a packet having an illegal length that is not permitted in a network to which the media converter belongs.

52 Claims, 16 Drawing Sheets

20
203
CPU
202
MAC
201
PHY
10
MEDIA CONVERTER (MC)
8-BIT MICROPROCESSOR
106
105
PLD
104
107
D
FIFO
D
103
PHY
PHY
101
102
SPECIFIED MODULATION LINK SIGNAL
UTP CABLE 100BASE-TX
RESPONSE PACKET
30
CPU
MAC
301
PHY
OPTICAL FIBER CABLE 100BASE-FX

MEDIA CONVERTER (MC)
10
8-BIT MICROPROCESSOR
105
PLD
104
FIFO
103
D
106
D
107
PHY
101
PHY
102
30
CPU
MAC
PHY
301
OPTICAL FIBER CABLE 100BASE-FX
20
CPU
203
MAC
202
PHY
201
SPECIFIED MODULATION LINK SIGNAL
UTP CABLE 100BASE-TX
RESPONSE PACKET 800
802
805
NIC
804
CPU
803
801
405
CPU
402
PHY
401
PHY
NETWORK MANAGEMENT TOOL
MC50
503
CPU
502
PHY
501
PHY
UTP2
FAILURE
FO
100BASE-TX
UTP1
100BASE-TX
20
CPU
MAC
PHY

MEDIA CONVERTER AND FAILURE DETECTION TECHNIQUE

BACKGROUND OF THE INVENTION

1. Field of the Invention

The present invention relates to a media converter for connecting from one type of transmission media to another, in particular to a control technique of the media converter and a failure detection technique in a network using media converters.

2. Description of the Related Art

There has been a lot of talk recently about FTTH (Fiber To The Home) allowing high-speed transmission of multimedia data such as music, moving picture, and medical data by the installation of optical fiber directly to the home. In an era of FTTH, a media converter is an indispensable communication device to connect a fiber-optic line to a computer in the home or office.

In general, a media converter has a pair of ports that are to be connected to a fiber-optic cable and a UTP cable, respectively. For each of the ports, a physical-layer device is provided, which supports MII (Media Independent Interface) conforming to IEEE802.3 standards.

In addition, it usually has a missing-link function such that, in case of disconnection in one link, the other link is automatically disconnected. For example, in the event that the link on the fiber-optic side has been disconnected due to some failure on the fiber-optic cable, the media converter automatically disconnects the other link on the UTP cable side.

In the case where such a media converter is used to connect the UTP cable to the fiber-optic cable, it is necessary to perform a link test to check whether each cable is properly connected to an opposite device on a corresponding link. A conventional media converter is provided with a link-test switch by which a link test function is activated to determine whether each link is properly established. The link status for each port is indicated by a light-emitting diode (LED) provided for each port.

There have been proposed various link test techniques of networks. For example, Japanese Patent Application Unexamined Publication No. 8-331126 discloses a link test method using a special control code. A switch transmits the special control code to another switch that is the opposite end of the link. The other switch, when receiving the control code, sends a response to the control code back to the source switch. The source switch analyzes the response message or detects the presence or absence of a response to determine whether the network link normally functions or not.

However, the above link test technique is designed to test a link between network switches and is fundamentally different in structure and function from a link test using a media converter designed to convert from one type of media to another with a missing-link function.

As described before, since a conventional media converter is set to the test mode by operating the link-test switch, it is impossible to activate the link test from cable side (unshielded twisted pair (UTP) cable or fiber-optic cable) and therefore difficult to perform the link test rapidly and easily. In other words, the conventional media converter is not designed to be controlled from network side due to its property.

When the missing-link function of media converter is activated, the host computer cannot monitor any status of the media converter, even if the media converter operates normally. Accordingly, when some failure occurs in the link through the media converter, the host cannot specify where a failure has occurred, in the link from the host to the media converter, in the media converter itself, or in the link away from the media converter.

SUMMARY OF THE INVENTION

An object of the present invention is to provide a media converter and a test method thereof allowing the test mode to be activated from cable side.

Another object of the present invention is to provide a failure detection method and system allowing easy detection of a failure and failure location in a link including media converters.

According to the present invention, a media converter includes: a first physical-layer interface to a first transmission medium; a second physical-layer interface to a second transmission medium; a memory connected between the first and second physical-layer interfaces, for temporarily storing data received from one of the first and second physical-layer interfaces; a determiner for determining whether a signal received at one of the first and second physical-layer interfaces is a trigger signal; and a controller for controlling such that, when the determiner determines that the trigger signal has been received at one of the first and second physical-layer interfaces, a response signal to the trigger signal is sent from a corresponding physical-layer interface that has received the trigger signal back to a source that transmitted the trigger signal.

According to an aspect of the present invention, the trigger signal may be a specified modulation link signal that is generated by modulating a normal link signal according to a predetermined modulation, wherein the determiner is a detector for detecting the specified modulation link signal that has been received at one of the first and second physical-layer interfaces.

As an example, a pulse width of the normal link signal is changed to generate the specified modulation link signal. As another example, an ON/OFF frequency of the normal link signal for a predetermined time period is changed to generate the specified modulation link signal. As still another example, a ratio of a pulse width to a predetermined time period is changed to generate the specified modulation link signal.

Each of the first and second physical-layer interfaces preferably supports MII (Media Independent Interface) conforming to IEEE802.3 standards. In this case, when the specified modulation link signal has been received at one of the first and second physical-layer interfaces, the controller may access the other one of the first and second physical-layer interfaces to acquire link information from the other physical-layer interface and generates the response signal corresponding to the link information. Further, the controller may have a missing link function such that, when one of the first and second physical-layer interfaces comes into link disconnection, the other one of the first and second physical-layer interfaces also comes into link disconnection. When the specified modulating link signal has been received under a missing link state, the controller may disable the missing link state to transmit the response signal back to the source.

According to another aspect of the present invention, the trigger signal may be a packet having an illegal length that is not permitted in a network to which the media converter belongs, wherein the determiner is a detector for detecting an illegal-length packet stored in the memory. The response signal may be an Ethernet packet, wherein a length of the trigger signal falls out of a prescribed length range of the Ethernet packet.

According to still another aspect of the present invention, the trigger signal may be an Ethernet packet having an address of a network management device stored in a source address field thereof and an address of the media converter itself stored in a destination address field thereof.

According to the present invention, a control method for a media converter comprising: a first physical-layer interface to a first transmission medium; a second physical-layer interface to a second transmission medium; and a memory connected between the first and second physical-layer interfaces, for temporarily storing data to be transferred between the first and second physical-layer interfaces, includes the steps of: a) determining whether a signal received at one of the first and second physical-layer interfaces is a trigger signal; b) when the trigger signal has been received at one of the first and second physical-layer interfaces, generating a response signal to the trigger signal; and c) transmitting the response signal from a corresponding physical-layer interface that has received the trigger signal back to a source that transmitted the trigger signal.

According to the present invention, a method for detecting a failure on a link through a plurality of media converters, each of which connects different types of media, includes the steps of: a) transmitting a special data block to each of the plurality of media converters, the special data block having a block length that is against prescribed standards; b) determining whether a response data block corresponding to the special data block is received from each of the plurality of media converters within a predetermined time period; and c) detecting a location of a failure based on a determination result of the step (b).

In the step (c), when the response data block corresponding to the special data block is not received from a corresponding media converter within the predetermined time period, it is determined that a failure occurs at a location beyond the corresponding media converter.

According to the present invention, a failure detection system includes: a link through a plurality of media converters connecting different types of media; a test manager connected to one of the media converters; wherein each of the media converters comprises: a first physical-layer interface to a first transmission medium; a second physical-layer interface to a second transmission medium; a memory connected between the first and second physical-layer interfaces, for temporarily storing data to be transferred between the first and second physical-layer interfaces; and a media converter controller a) determining whether a signal received at one of the first and second physical-layer interfaces is a trigger signal; b) when the trigger signal has been received at one of the first and second physical-layer interfaces, generating a response signal to the trigger signal; and c) transmitting the response signal from a corresponding physical-layer interface that has received the trigger signal back to a source that transmitted the trigger signal. The test manager includes a test manager controller transmitting the special data block to the link through the media converter connected to the test manager; determining whether the response data block is received from each of the media converters within a predetermined time period; and detecting a location of a failure based on whether the response data block is received from each of the media converters within the predetermined time period.

When the response data block is not received from a corresponding media converter within the predetermined time period, the test manager controller determines that a failure occurs at a location beyond the corresponding media converter.

According to the present invention, a method for detecting a failure that occurs at a desired one of a plurality of media converters included in a network, includes the steps of: a) transmitting a trigger data block having an address of a desired media converter stored in a destination address field thereof and an address of a predetermined management device stored in a source address field thereof; b) determining whether a response data block corresponding to the trigger data block is received or not from the desired media converter within a predetermined time period; and c) detecting a failure at the desired media converter based on a determination result of the step (b).

According to the present invention, a failure detection system in a network including a plurality of media converters and a management device, wherein each of the media converters comprises: a first physical-layer interface to a first transmission medium; a second physical-layer interface to a second transmission medium; a memory connected between the first and second physical-layer interfaces, for temporarily storing data to be transferred between the first and second physical-layer interfaces; and a media converter controller for determining whether a received data block stored in the memory is a trigger data block having an address of an arbitrary media converter stored in a destination address field thereof and an address of the management device stored in a source address field thereof; when it is determined that the received data block is the trigger data block, generating the response data block corresponding to the trigger data block; and transmitting the response data block from a corresponding one of the first and second physical-layer interfaces back to a source that has transmitted the trigger data block. The management device determines whether a response data block to the trigger data block is received from the arbitrary media converter within a predetermined time period; and detecting a location of a failure based on whether the response data block is received from the arbitrary media converter within the predetermined time period.

The management device may include link information of the media converters in the network, and transmits a trigger data block to each of the media converters on a path from the management device to the arbitrary media converter to perform a response test, wherein the trigger data block has an address of each of the media converters on the path stored in the destination address field thereof.

DESCRIPTION OF THE PREFERRED EMBODIMENTS

First Embodiment

Figure 1:
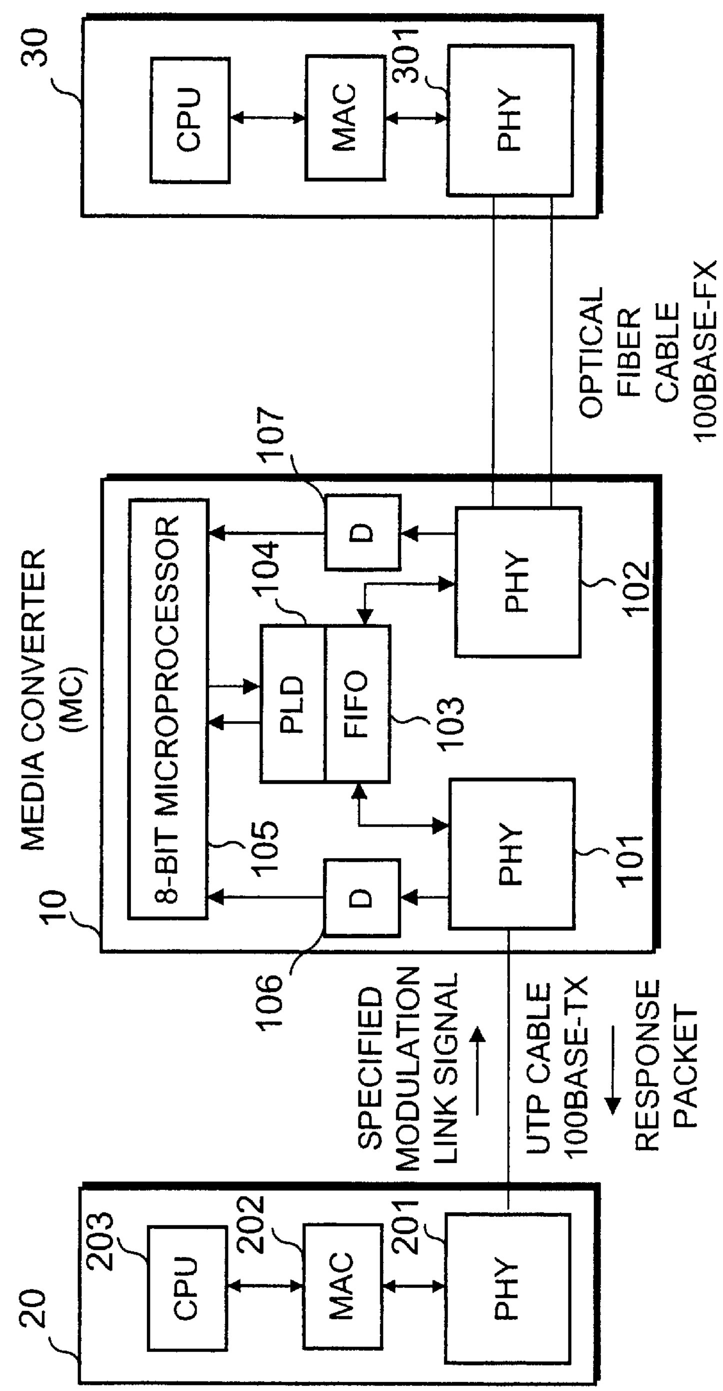
FIG. 1 is a block diagram showing a first embodiment of a media converter according to the present invention.

Referring to FIG. 1, a media converter (MC) 10 is connected to a host computer or management switch 20 through 100BASETX:UTP cable and is connected to the other host computer or management switch 30 through 100BASE-FX:optical cable. Needless to say, this system is shown just as an example for simplicity.

Media Converter

The media converter 10 has a pair of ports, which are provided with physical-layer devices (PHYs) 101 and 102 connected to the UTP cable and the optical fiber cable, respectively. As described before, the physical-layer devices 101 and 102 support MII (Media Independent Interface) conforming to IEEE802.3 standards.

The media converter 10 is further provided with a FIFO (First-in-first-out) memory 103 that is connected between the physical-layer devices 101 and 102 to absorb frequency deviations between transmission and reception. Data received at one physical-layer device are sequentially written into the FIFO memory 103 and then read out from the FIFO memory 103 in the same sequence to be output to the other physical-layer device.

In addition, the FIFO memory 103 is connected to a PLD (programmable logic device) 104 that has been programmed to provide a predetermined logical function. The PLD 104 is designed to check data stored in the FIFO memory 103 at a predetermined timing after a packet has been received and, to output the check result to a microprocessor 105.

The respective physical-layer devices 101 and 102 are connected to specified modulation link signal detectors 106 and 107, which detect specified modulation link signals received from UTP and optical cables, respectively. In the case where a received link signal has been modulated in a predetermined modulation scheme, a corresponding specified modulation link signal detector outputs an enable signal to the microprocessor 105.

In general, each of the physical-layer devices 101 and 102 transmits a normal link signal (link test pulse signal) to the other end of connection at predetermined intervals, and receives the normal link signal from the other end to monitor the status of a corresponding link at all times. According to the first embodiment, a modulated link signal is used as a trigger signal to activate the test mode of a media converter.

As described below, after the microprocessor 105 receives an enable signal from the specified modulation link signal detector (D) 106 or 107, the microprocessor 105 generates a predetermined response packet and controls the corresponding physical-layer device to send it back to the source of the received packet.

Further, the microprocessor 105 can access various types of internal registers including a farEF (far End Fault) register and a Force Link register incorporated in the physical-layer devices 101 and 102 according to physical-layer MII conforming to IEEE802.3 standards. Accordingly, for example, link information indicating link establishment status and/or half/full duplex can be acquired from each physical-layer device. Furthermore, it is possible to force the physical-layer device being in link disconnection status into transmittable state by accessing the Force Link register thereof.

The management switch 20 is similarly provided with a physical-layer device 201 that supports MII (Media Independent Interface) conforming to IEEE802.3 standards, MAC (Media Access Control) layer device 202, and a microprocessor (CPU) 203. The physical-layer device 201 is connected to the physical-layer device 101 of the media converter 10 through the UTP cable. As described above, the physical-layer device 201 regularly transmits link signals to the physical layer device 101 of the media converter, and further can transmit the above-described specified modulation link signals under control of the microprocessor 203.

The microprocessor 203 can access various types of internal registers incorporated in the physical-layer device 201 according to IEEE802.3-standard MII. Accordingly, link information indicating link establishment status through UTP cable can be acquired from the physical-layer device 201. Furthermore, it is possible to force the physical-layer device 201 being in link disconnection status into transmittable state by accessing the Force Link register thereof.

The management switch 30 also has a circuit structure similar to the management switch 20. Its physical-layer device 301 is connected to the physical-layer device 102 of the media converter 10 through the optical cable. The physical-layer device 301 also supports MII (Media Independent Interface) conforming to IEEE802.3 standards.

In the case where a normal Ethernet packet is transferred, the media converter 10 performs only normal media conversion. More specifically, a normal Ethernet packet received from the management switch 20 is converted into optical data by the media converter 10 and the optical data is transmitted to the destination host computer or management switch 30 through the optical cable. Contrarily, normal optical data received from the management switch 30 is converted into normal Ethernet packet by the media converter 10 and the normal Ethernet packet is sent to the management switch 20 through UTP cable.

In the case where a response test is activated, the management switch 20 generates a specified modulation link signal, and transmits it to the media converter 10. Various modulation schemes can be employed. Here, three examples of a specified modulation link signal are shown in FIGS. 2A, 2B, and 2C, respectively.

Figure 2A:
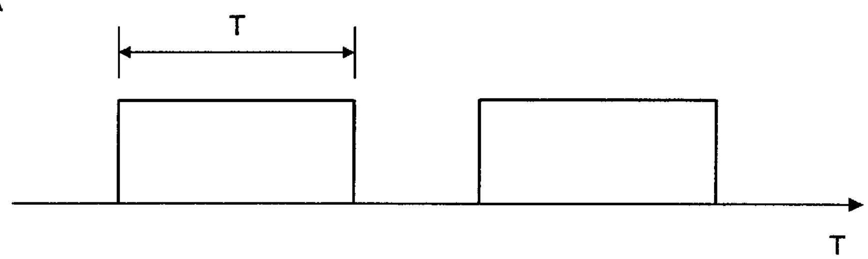
FIG. 2A is a wave form chart showing a first example of a specified modulation link signal.

Referring to FIG. 2A, the pulse width T of a link test pulse is set longer or shorter than a normal pulse width. Such a modulated link signal can be used as a trigger signal to start the test.

Figure 2B:
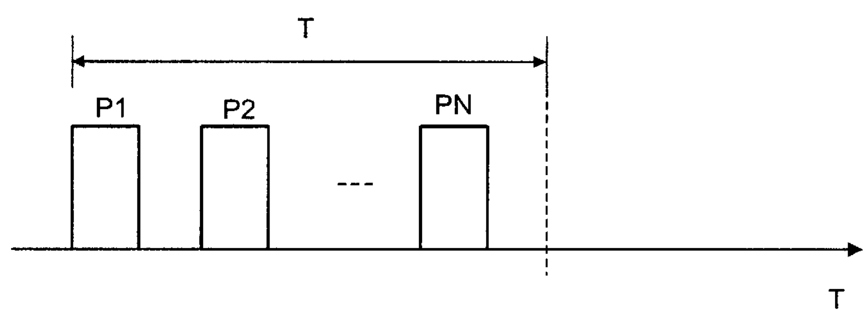
FIG. 2B is a wave form chart showing a second example of a specified modulation link signal.

As shown in FIG. 2B, an ON/OFF frequency of a link test pulse for a predetermined time period T can be a modulation component used to start the test. In this case, for the predetermined time period T, N link test pulses P1–PN each having a short pulse width are transmitted.

Figure 2C:
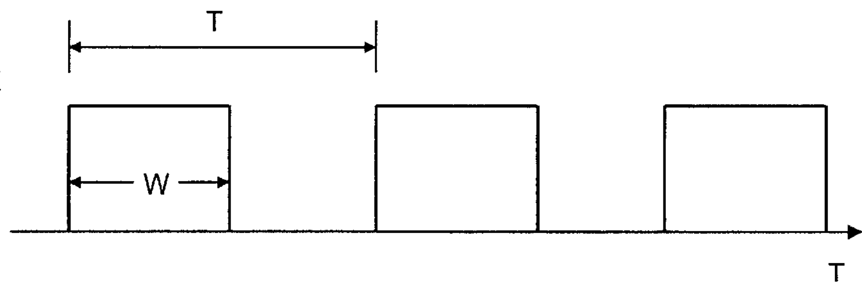
FIG. 2C is a wave form chart showing a third example of a specified modulation link signal.

As shown in FIG. 2C, a ratio of pulse width W to a predetermined time period T, that is, a ratio of the ON time period W and the OFF time period) can be a modulation component used to start the test. The details of a response test in a media converter will be described hereafter.

Response Test Sequence

Figure 3:
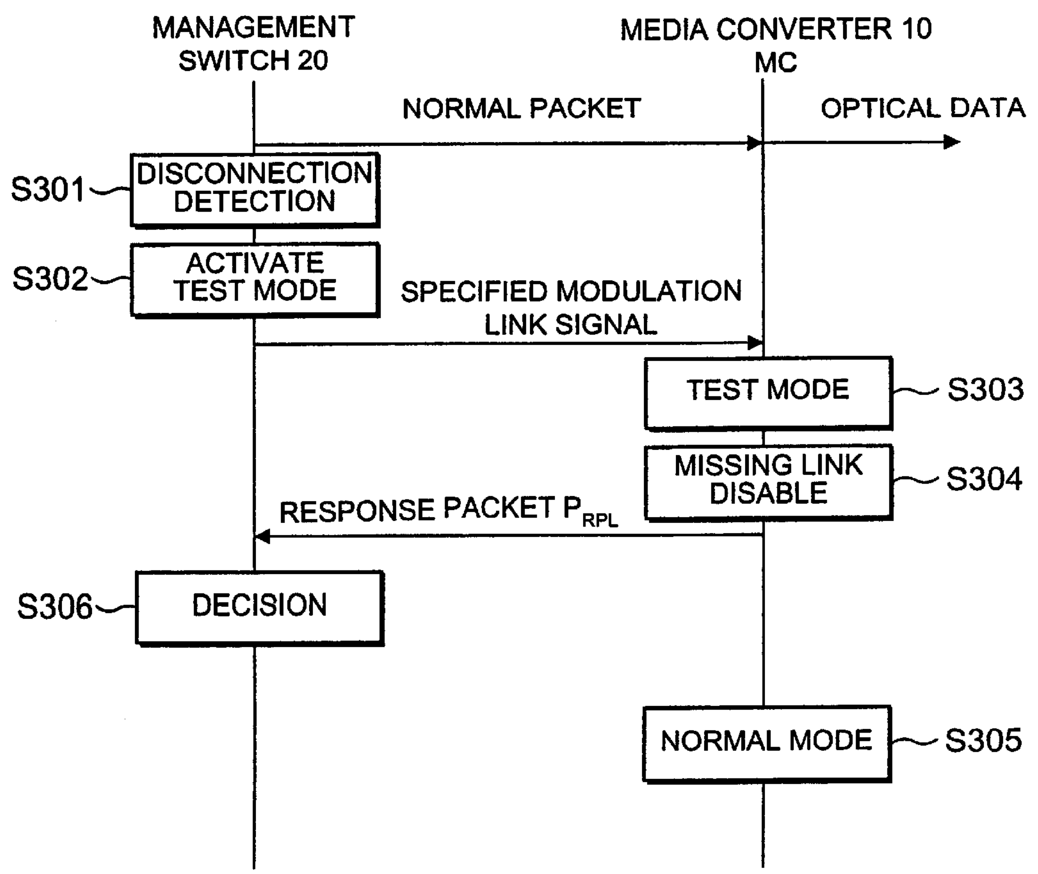
FIG. 3 is a diagram showing a sequence of response test operation in the first embodiment.

Referring to FIG. 3, when link disconnection is detected in a management switch 20 (step S301), a microprocessor 203 starts a test program (step S302). In the test mode, the microprocessor 203 controls the physical layer device 201, and transmits the specified modulation link signal through the UTP.

When the specified modulation link signal detector 106 detects the specified modulation link signal as a trigger signal, the media converter 10 is switched to the test mode (step S303), releasing (Disabling) a missing link function (step S304) and a response packet $P_{RPL}$ is returned through the same physical-layer device 101 to the management switch 20. When a predetermined time has elapsed after the test mode, the media converter 10 returns to the normal mode (step S305).

When the management switch 20 receives the specified response packet $P_{PRL}$, it is determined that the link is normally established. When the management switch 20 does not receive the response packet $P_{RPL}$ within a predetermined time period or the response packet $P_{RPL}$ is not the specified one, it is determined that a failure has occurred (step S306).

Referring to FIG. 3, the response test in the normal mode is shown. However, in the case where the link is disconnected due to the missing link function, the similar response test can be also made. The test operations in the media converter 10 and management switch 20 in the missing-link mode will be described hereafter.

Test Control of Media Converter

Figure 4:
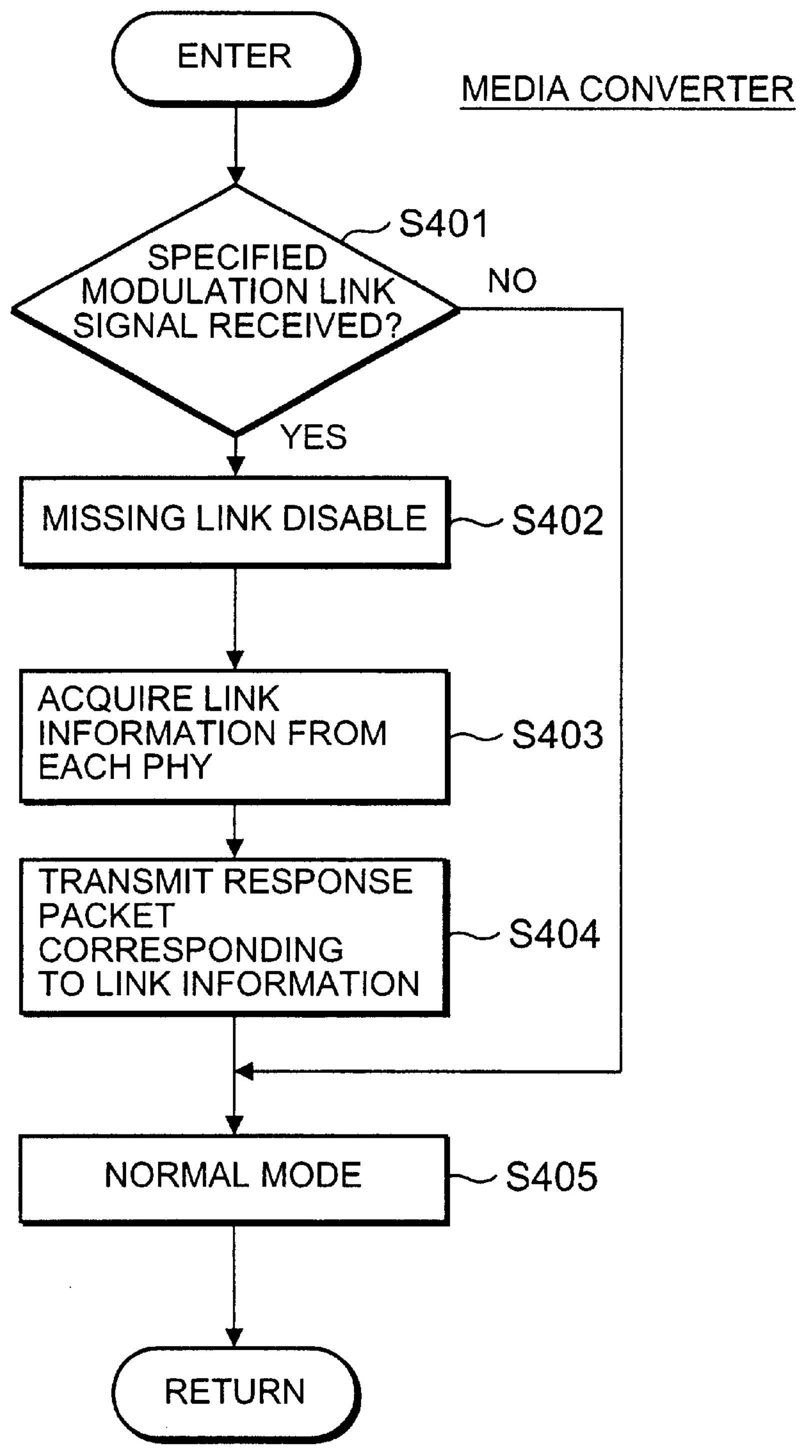
FIG. 4 is a flowchart showing a test control operation in the media converter.

Referring to FIG. 4, when the media converter 10 is in missing link mode, the physical-layer devices 101 and 102 are set to be incapable of transmitting but still capable of receiving.

The specified modulation link signal detector 106 or 107 determine whether the specified modulation link signal is received or not (step S401.) When the specified modulation link signal is received (YES at step S401), the specified modulation link signal detector outputs the enable signal to the microprocessor 105, and the microprocessor 105 switches its operation mode to the test mode and disables the missing link function (step S402.)

Then, the microprocessor 105 accesses internal resistors of each physical-layer device to get link information (step S403.) In this case, since the physical-layer device 101 has received the specified modulation link signal, the microprocessor 105 accesses the resistors of the corresponding physical-layer device 102 to acquire link information of the optic cable side.

Subsequently, the microprocessor 105 generates a response packet $P_{RPL}$ having the acquired link information written in the source address field thereof, and transmits it from the physical-layer device 101 which has received the specified modulation link signal, to the source (step S404.) After that, the microprocessor 105 returns to the normal mode (step S405.) When the received packet is not the specified modulation link signal (No at step S401), the packet is transferred in the normal mode.

Test Control of Management Switch

It is assumed that the link of UTP cable side is disconnected due to some cause. In this case, the management switch 20 cannot know where a failure occurs. For example, the management switch 20 detects only the link disconnection of UTP cable side when the UTP cable is cut or when the media converter 10 enables the missing link function caused by disconnection of the optic cable side.

Figure 5:
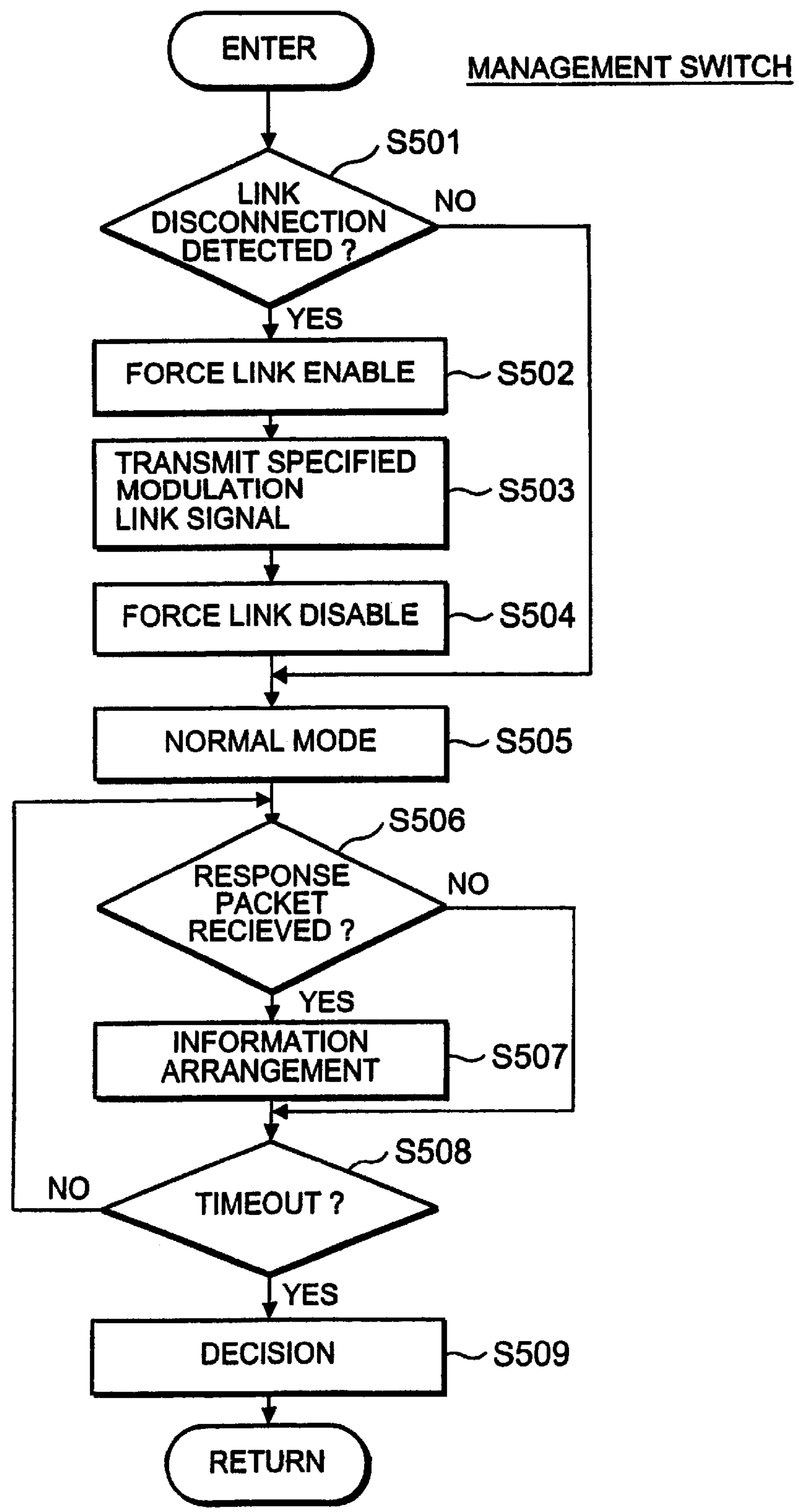
FIG. 5 is a flowchart showing a test control operation of a management switch.

Referring to FIG. 5, when the microprocessor 203 detects the link disconnection of UTP cable side (YES at step S501), the microprocessor 203 accesses the force link register of the physical-layer device 201 to force the physical-layer device 201 into ForceLink Enable status (step S502.)

The microprocessor 203 controls the physical-layer device 201 to transmit a specified modulation link signal (step S503). After the physical-layer device 201 releases the ForceLink Disable status (step S504), it returns to the normal mode (step S505) and waits for a corresponding response packet to the specified modulation link to be received within the predetermined time (steps S506, S507 and S508.)

When the response packet $P_{PRL}$ is received within the predetermined time (YES at step S506), the link information of the media converter included in the response packet $P_{PRL}$ is read to analyze (step S507). After the predetermined time has passed (YES at step S508), the judgment based on the received link information is made (step S509.)

For example, in the case where the response packet $P_{PRL}$ is received within the predetermined time, it can be determined that at least the UTP cable and the media converter 10 operates normally and a failure occurs in more distant cable or devices. In this case, it can be verified from the link information included in the response packet $P_{PRL}$ that the failure may occur in the optic cable side. In the case the response packet $P_{PRL}$ is not received within the predetermined time (NO at step S506 and YES at step S508), it can be determined that the UTP cable and/or the media converter 10 have some failure.

As described above in detail, the media converter according to the first embodiment is switched to the test mode when receiving the specified modulation link signal, and the response packet is sent back to the source. In this way, the response test can be activated from the cable side.

Then, when the link disconnection is detected, the host side forces the physical-layer device into ForceLink enable status to transmit the specified modulation link signal. When the media converter under the missing link status receives the specified modulation link signal, the media converter disables the missing link function to send the response packet back to the source. Therefore, when receiving the response packet, the host side can determine that at least the media converter and the link reaching to the media converter operate normally, while when the response packet is not returned, it can be determined that at least one of the media converter and the link has some failure.

Second Embodiment

Media converter

Figure 6:
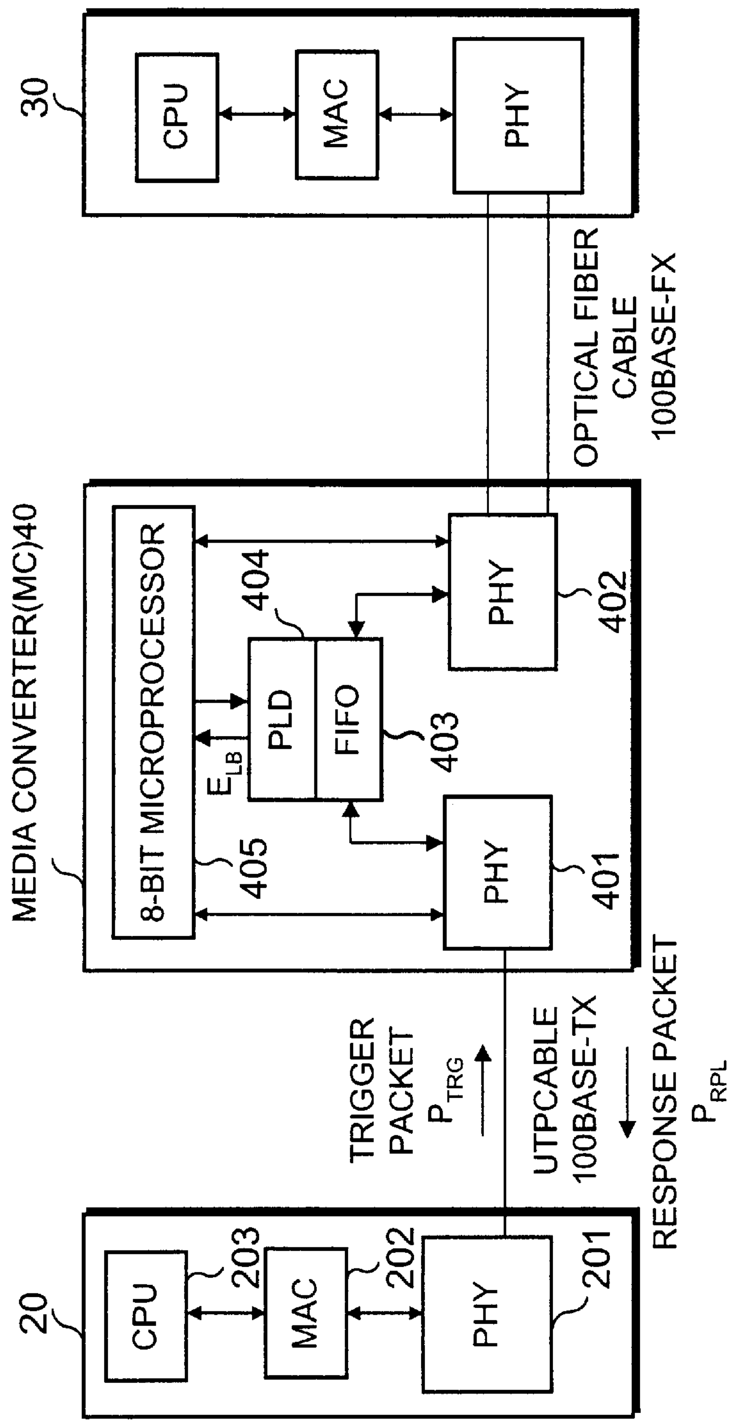
FIG. 6 is a block diagram showing a media converter according to a second embodiment of the present invention.

Referring to FIG. 6, a media converter (MC) 40 is connected to a host computer or management switch 20 through 100BASETX:UTP cable and to the other host computer or management switch 30 through 100BASE-FX:optical cable. Needless to say, this system is shown just as an example for simplicity.

The media converter 40 has a pair of ports, which are provided with physical-layer devices (PHYs) 401 and 402, each connected to UTP cable and optical cable, respectively. As described before, each of the physical-layer devices 401 and 402 supports MII (Media Dedicated Interface) conforming to IEEE802.3 standards.

The media converter 40 is further provided with a FIFO (First-in-first-out) memory 403 that is connected between the physical-layer devices 401 and 402 to absorb frequency deviations between transmission and reception. Data received at one physical-layer device are sequentially written into the FIFO memory 403 and then read out from the FIFO memory 403 in the same sequence to be output to the other physical-layer device.

In addition, the FIFO memory 403 is connected to a PLD (programmable logic device) 404 that has been programmed to provide a predetermined logical function. The PLD 404 is designed to discriminate a predetermined packet as a packet for starting test mode (hereafter, called a trigger packet.) In this case, the PLD 404 discriminates a received packet whose length falls out of a prescribed range or whose MAC address of destination indicates the address of its own, and outputs an enable signal $E_{LB}$ to a microprocessor 405 only when it is determined to be a trigger packet. The details will be described later.

The microprocessor 405, when receiving the enable signal $E_{LB}$ from the PLD 404, generates a predetermined response packet and controls a corresponding physical-layer device to send it as a reply to the received packet back to the source.

Further, the microprocessor 405 can access various types of internal registers including a farEF (far End Fault) register and a Force Link register incorporated in each of the physical-layer devices 401 and 402 according to MII conforming to IEEE802.3 standards. Accordingly, for example, link information indicating link establishment status and/or half/full duplex can be acquired from each physical-layer device. Furthermore, it is possible to force the physical-layer device being in link disconnection status into transmittable state by accessing the Force Link register thereof.

The management switch 20 is provided with a physical-layer device 201 that supports MII (Media Dedicated Interface) conforming to IEEE802.3 standards, MAC (Media Access Control) layer device 202, and a microprocessor (CPU) 203. The physical-layer device 201 is connected to the physical-layer device 401 of the media converter 40 through the UTP cable. The microprocessor 203 can access respectively various types of internal registers incorporated in the physical-layer device 201 according to IEEE802.3-standards MII. Accordingly, link information indicating link establishment status can be acquired from the physical-layer device 201. Furthermore, it is possible to force the physical-layer device 201 being in link disconnection status into transmittable state by accessing the Force Link register thereof.

The management switch 30 has a circuit structure similar to the management switch 20. Its physical-layer device is connected to the physical-layer device 402 of the media converter 40 through the optical cable. The physical-layer device also supports MII (Media Dedicated Interface) conforming to IEEE802.3 standards.

In the case where a normal Ethernet packet is transferred, the media converter 40 performs only normal media conversion. More specifically, a normal Ethernet packet received from the management switch 20 is converted into optical data by the media converter 40 and the optical data is transmitted to the destination host computer or management switch 30 through the optical cable. Contrarily, normal optical data received from the management switch 30 is converted into normal Ethernet packet by the media converter 40 and the normal Ethernet packet is sent to the management switch 20 through UTP cable.

Contrarily in the case where a response test is activated, the management switch 20 generates a trigger packet $P_{TRG}$ and transmits it to the media converter 40.

Trigger Packet

A packet falling out of IEEE802.3 network standards can be used as a trigger packet.

Figure 7A:
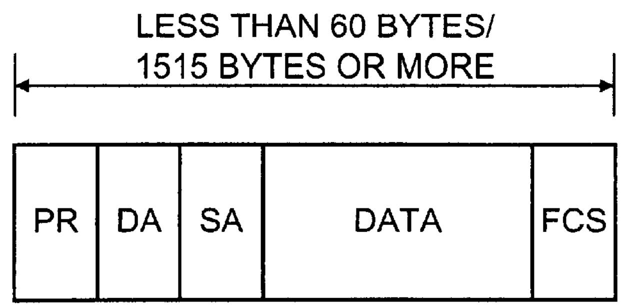
FIG. 7A is a format diagram showing a first example of a trigger packet.

Referring to FIG. 7A, a packet length is set longer or shorter than defined by the IEEE802.3 network standards. According to the IEEE802.3 network standards, a packet length is set from a minimum length of 60 bytes to a maximum length of 1514 bytes. Accordingly, when the length of a packet is less than 60 bytes or 1515 bytes or more, it is discriminated as an illegal packet having some special instruction (in this case, a trigger packet for starting the test mode).

Since such a trigger packet has an irregular packet length out of the IEEE802.3 standards, only a network device having a function of detecting such an illegal packet (here, a media converter) can receive it and other devices discard it. Accordingly, even if a trigger packet is transmitted through a network structured by links through a plurality of media converters, only a media converter switches to the test mode in response to this trigger packet and transmits the response packet back as described later. Even if the host computer receives the trigger packet, it is automatically discarded due to its illegality.

Figure 7B:
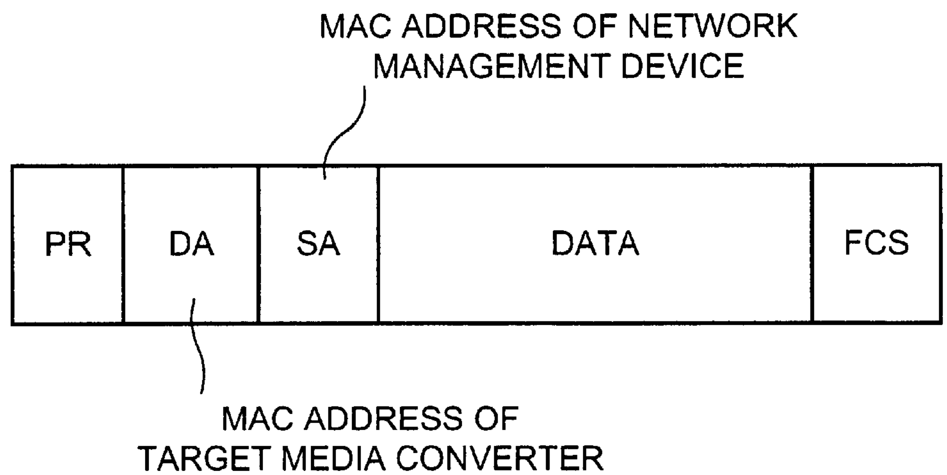
FIG. 7B is a format diagram showing a second example of a trigger packet.

As shown in FIG. 7B, a normal Ethernet packet can be used. In this example, similarly to a normal Ethernet packet, a trigger packet is composed of 8-byte preamble, 6-byte destination address (DA) field, 6-byte source address (SA) field, data field of 48 to 1502 bytes, and 4-byte FCS field. In the case of such a trigger packet, the MAC address of a target media converter is written in the destination address field, and the address of a network management device is written in the source address field.

In this example, as described below, a MAC address according to IEEE 802.3 is uniquely assigned to each media converter on the network. With use of normal Ethernet packet, the response test of a target media converter can be allowed in any types of network.

Media Converter with Test Manager

Figure 8:
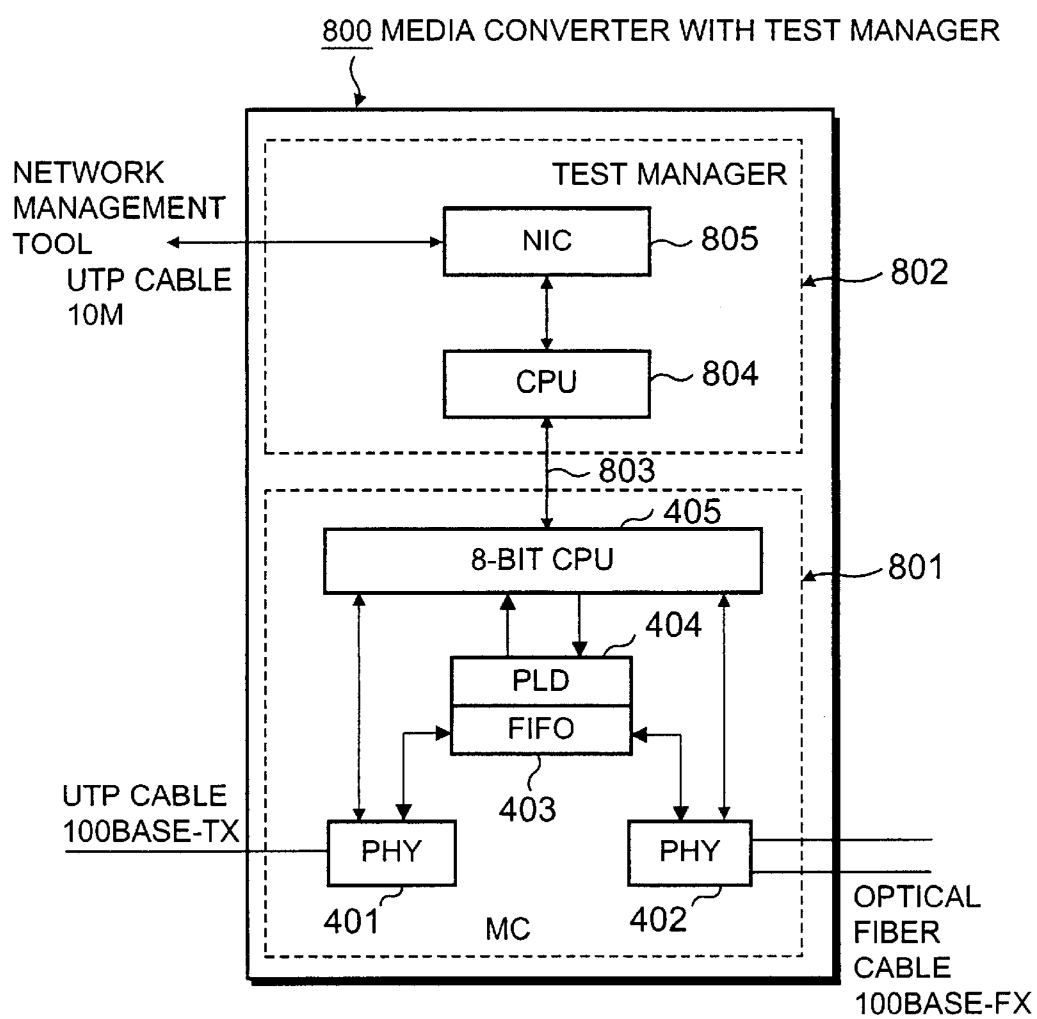
FIG. 8 is a block diagram showing a media converter with test manager according to a third embodiment of the present invention.

Referring to FIG. 8, a media converter with a test manager 800 according to the second embodiment is composed of a media converter 801 and a test manager 802 connected with a microprocessor 405 by a dedicated bus 803. Since the media converter 801 has the approximately same structure as the media converter 40 shown in FIG. 6, circuit blocks similar to those previously described in FIG. 6 are denoted by the same reference numerals and their descriptions will be omitted.

The test manager 802 includes a microprocessor 804 connected with the microprocessor 405 of the media converter 801 by the bus 803, and a network interface card (NIC) 805. The network interface card 805 is connected with a network management tool through an UTP cable.

As described later, the test manager 802 monitors a link disconnection, instructs starting of the test, and arranges or judges transmitted information. Although the media converter 801 performs basically similar operations to the media converter 40 as described above, the media converter 801 has a different point that control signals and data are exchanged with the microprocessor 804 of the test manager 802 through the dedicated bus 803.

The test operation of a system using the media converter with test manager 800 will be described in detail hereafter.

Test Sequence

Figure 9:
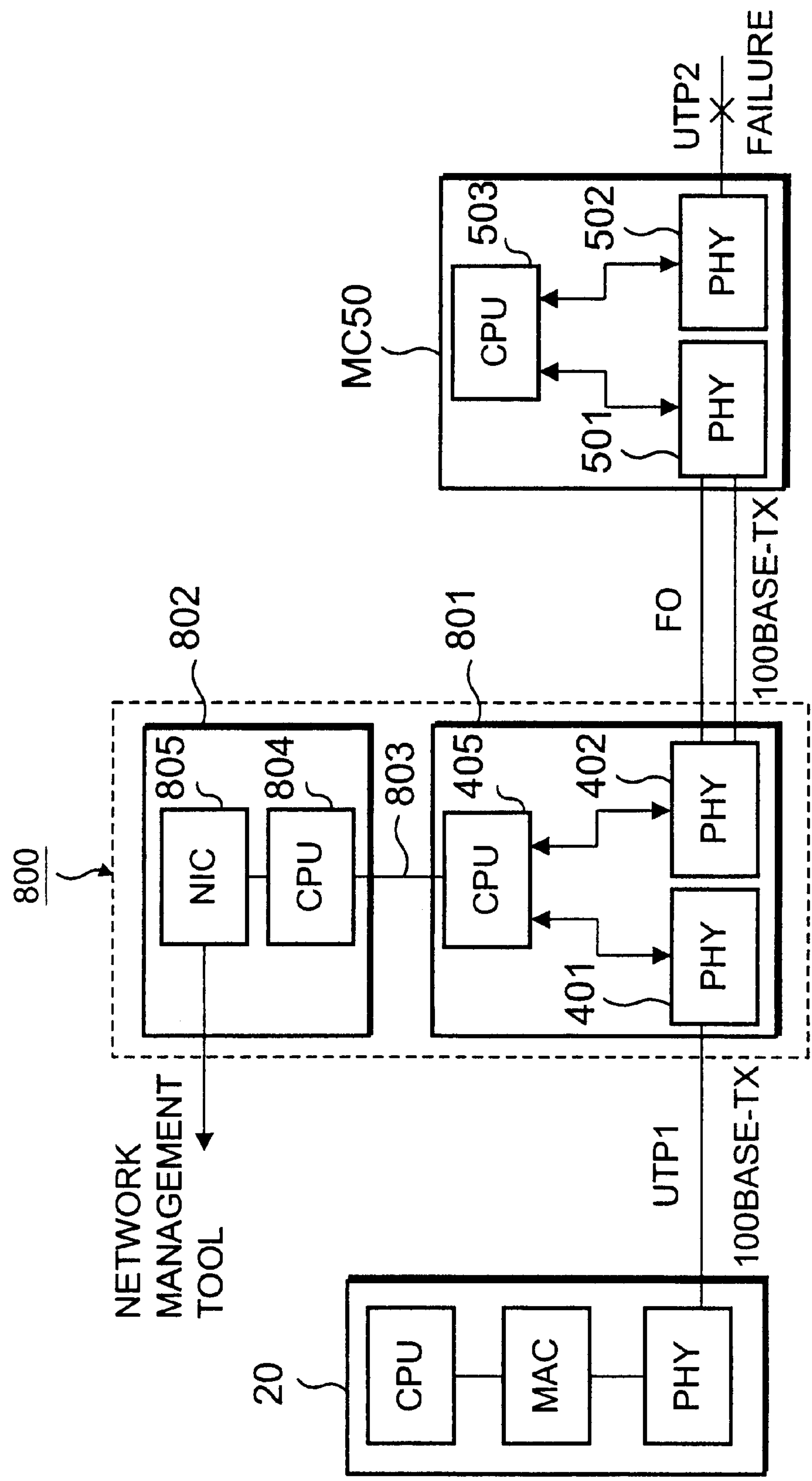
FIG. 9 is a block diagram showing a schematic configuration of network system for explaining a failure detection method according to the present invention.

Referring to FIG. 9, it is assumed for simplicity that the media converter with test manager 800 is connected with the management switch 20 through UTP cable UTP1 and with the other media converter 50 through the optic fiber cable FO and the media converter 50 is further connected with UTP cable UTP2.

It is further assumed that a failure has occurred in UTP cable UTP2. In this case, since the missing link function is active at the media converter 50 and the media converter 801 of the media converter with test manager 800, the entire link is in a disconnection status.

Figure 10:
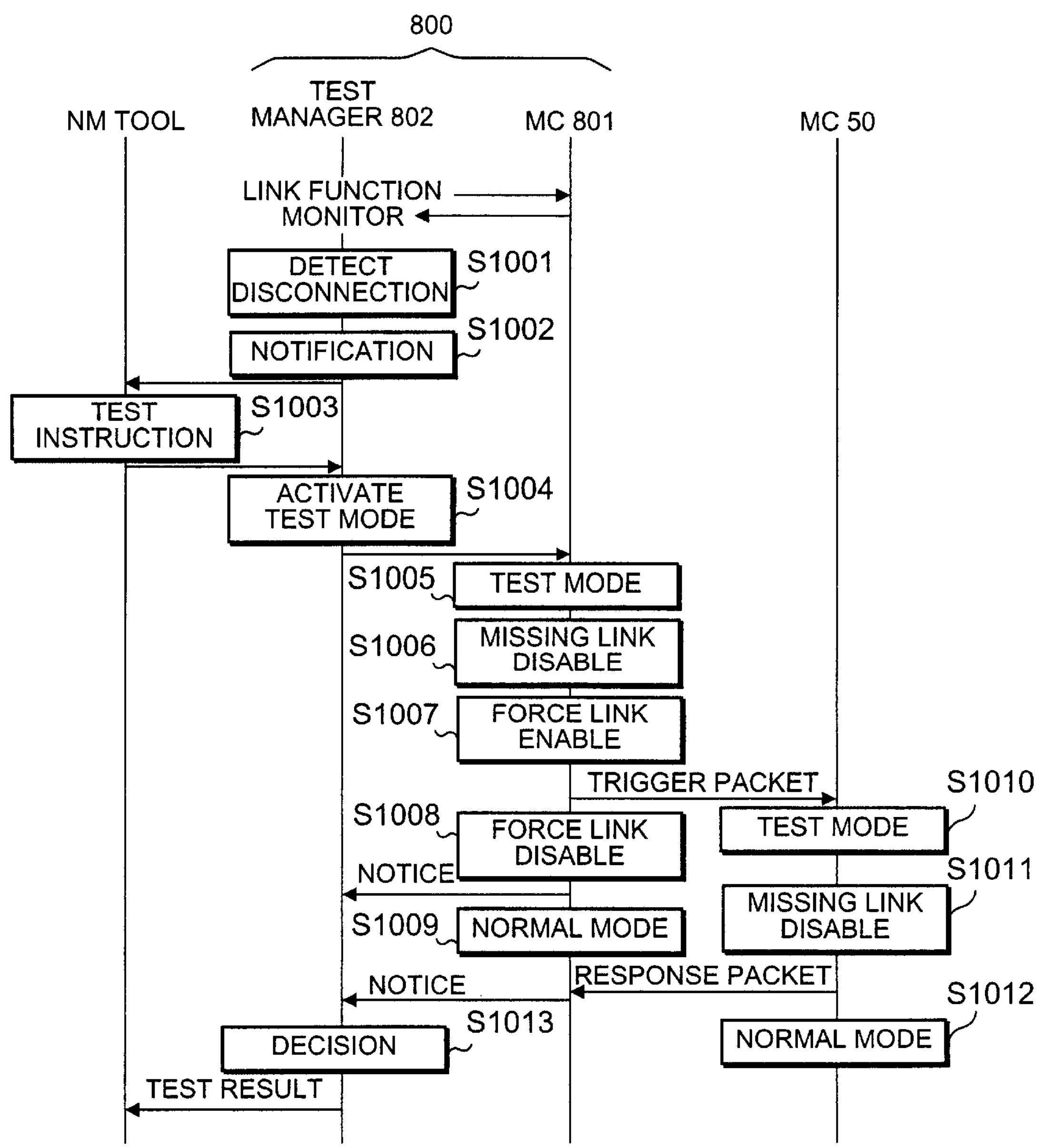
FIG. 10 is a diagram showing a sequence of response test operation in the present failure detection method.

Referring to FIG. 10, the test manager 802 monitors the link status through the media converter 801, and when it detects the link disconnection (step S1001), the test manager 802 notifies the network management tool of the link disconnection status (step S1002). When the network management tool receives the notification of link disconnection, it instructs the test manager 802 to start the test program (step S1003).

When instructed by the network management tool, the test manager 802 starts the test mode (step S1004) and causes the media converter 801 to switch to the test mode (Step S1005). Then, the media converter 801 disables the missing link function (step S1006), and switches the physical-layer device 402 to ForceLink Enable status (step S1007) to transmit the trigger packet to the media converter 50. After transmitting the trigger packet, the media convert 801 disables the ForceLink (step S1008) and notifies the test manager 802 of the link information. Thereafter, the media converter 801 returns to the normal mode (step S1009) and then waits for the corresponding response packet to the trigger packet to be received.

On the other hand, when having received the predetermined trigger packet as shown in FIG. 7A or the trigger packet addressed thereto as shown in FIG. 7B, the media converter 50 is switched to the test mode (step S1010) and disables the missing link function to transmit a response packet back to the media converter 801 (step S1011). Thereafter, the media converter 50 returns to the normal mode (step S1012). When the media converter 801 receives the response packet from the media converter 50, the media converter 801 reads the link information from the response packet and notifies the test manager 802.

The test manager 802 analyzes the link information received from the media converters 801 and 50 to judge the location of a failure (step S1013), and notifies the network management tool of the test result.

Operation of Media Converter 801

Figure 11:
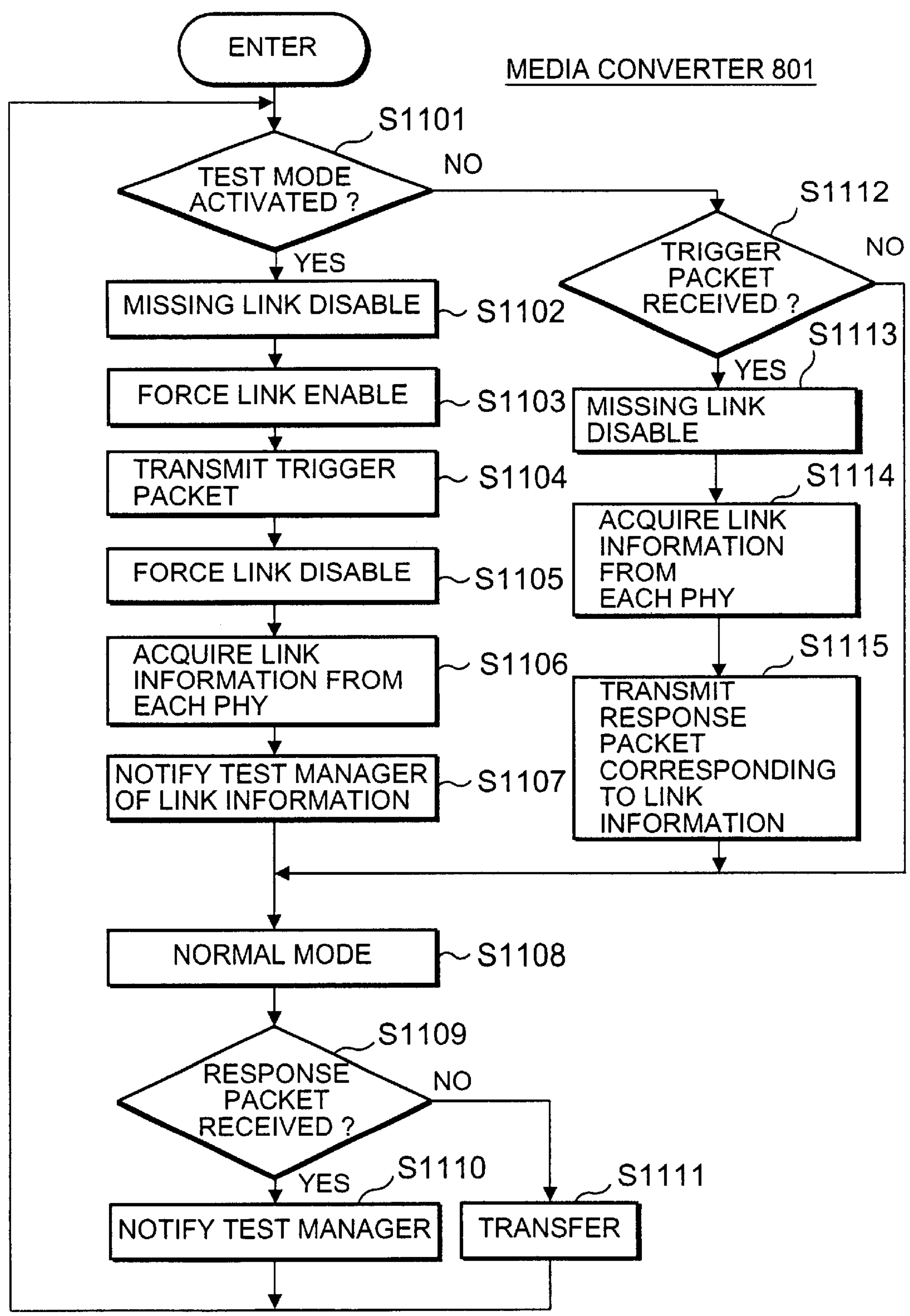
FIG. 11 is a flowchart showing a test control operation in the media converter with test manager.

Referring to FIG. 11, when the test manager 802 starts the test mode (YES at step S1101), the microprocessor 405 of the media converter 801 disables the missing link function (step S1102), and switches the physical layer device 402 to ForceLink Enable status to transmit a packet to the next media converter 50 (step S1103). After transmitting the trigger packet addressed to the next media converter 50 (step S1104), the microprocessor 405 disables ForceLink status (step S1105) and then acquires the link information from each physical layer device (step S1106). The microprocessor 405 notifies the test manager 802 of the acquired link information through the dedicated bus 803 (step S1107).

Then, the microprocessor 405 returns to the normal mode (step S1108) and waits for the response packet to the transmitted trigger packet to be received (step S1109). When the microprocessor 405 receives the response packet (YES at step S1109), it reads the link information from the response packet to notify the test manager 802 (step S1110). When the microprocessor 405 receives any packet other than the response packet (NO at step S1109), it just transfers it (step S111).

When the test mode is not started (NO at step S1101), the microprocessor 405 determines whether the trigger packet has been received or not (step S1112). When the trigger packet has not been received (NO at step S1112), the control goes to the step S1108. Specifically, when the physical-layer device 401 or 402 receives a packet, the PLD 404 determines whether the data stored in the FIFO memory 403 at the predetermined timing is the predefined trigger data (see FIG. 7).

When the predetermined trigger packet as shown in FIG. 7A or the trigger packet addressed thereto as shown in FIG. 7B are received (YES at step S1112), the microprocessor 405 of media converter 801 disables the missing link function (step S1113) and acquires the link information from each physical layer device (step S1114). As described above, the microprocessor 405 generates the response packet having the acquired link information written in the predetermined location, and transmits it to the source side of trigger packet (step S1115). After transmitting the response packet, the control goes to the step S1108.

Operation of Test Manager

Figure 12:
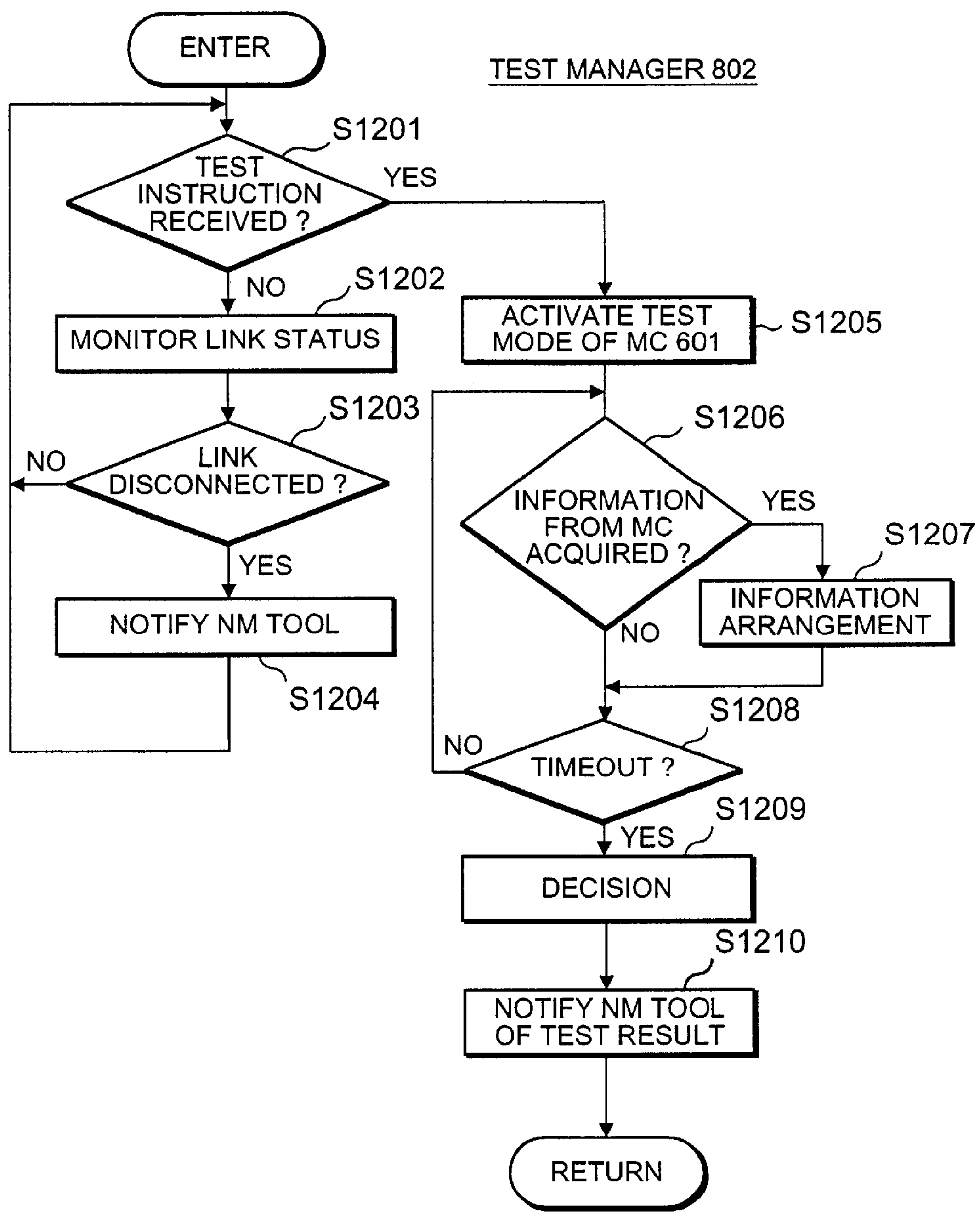
FIG. 12 is a flowchart showing a test control operation in the test manager.

Referring to FIG. 12, the microprocessor 804 of the test manager 802 monitors the link status through the microprocessor 405 of media converter 801 (step S1202) and decides whether the link is disconnected or not (step S1203), as long as it is not instructed to start the test from the network management tool (No at step S1201). When the link status is normal (NO at step S1203), steps S1201 and S1202 are repeated.

When the microprocessor 804 detects the link disconnection (YES at step S1203), the microprocessor 804 notifies the network management tool of the link disconnection (step S1204) and waits for the test startup instruction to be received from the network management tool. When the microprocessor 804 is instructed to start the test by the network management tool (YES at step S1201), it starts the test mode of media converter 801 (step S1205) and waits for link information to be received from media converters (here, MC801 and MC50) within a predetermined time-out period (steps S1206–S1208).

Upon receipt of link information from a media converter (YES at step S1206), the microprocessor 804 arranges the link information (step S1207) and, after an elapse of the predetermined time, determines a test result based on the acquired link information (step S1209). For example, if the microprocessor 804 does not acquire link information from the media converter 50 within the predetermined time but from the media converter 801, it can be determined that a failure occurs in the media converter 50 or the optic fiber cable connected between the media converters 801 and 50. In the case where the microprocessor 804 receives the notification within the predetermined time from both media converters 801 and 50, it can be determined from the link information received from the media converter 50 whether a failure occurs (see FIG. 9). The test manager 802 notifies the network management tool of the test result (step S1210).

As described above, in the network composed of plural media converters, when trigger packets are sequentially transmitted to plural media converters, it is possible to detect a failure based on their response packets. Since the above-described failure detection can be made by using only media converter with test manager 800, without any additional functions to management switch 20, the system structure is simplified.

Operation of Media Converter 50

Figure 13:
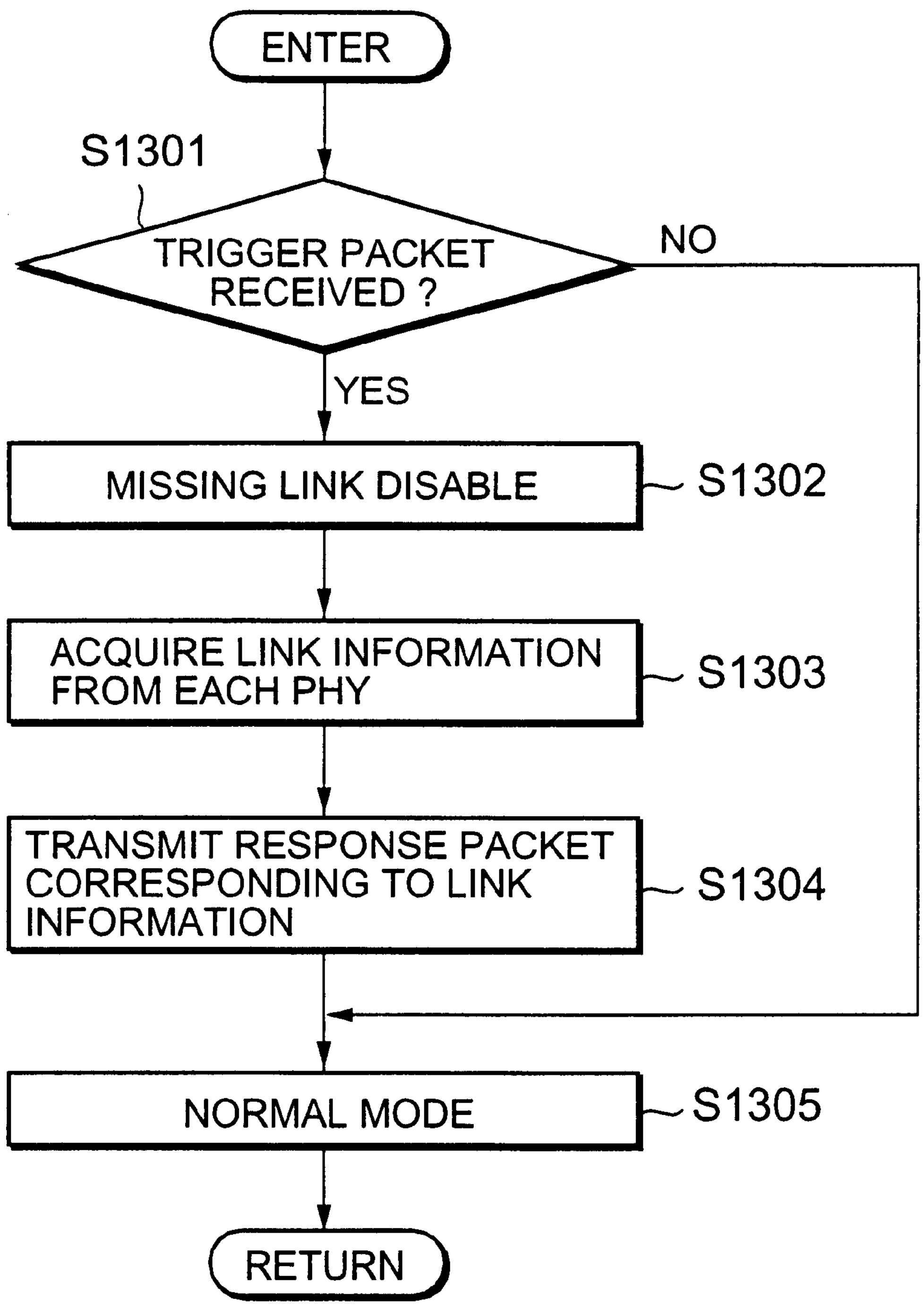
FIG. 13 is a flowchart showing a test control operation in the media converter.

Referring to FIG. 13, the microprocessor 503 determines whether the trigger packet has been received or not (step S1301), and when the predetermined trigger packet as shown in FIG. 7A or the trigger packet addressed thereto as shown in FIG. 7B are received (YES at step S1301), the microprocessor 503 disables the missing link function (step S1302) and acquires the link information from each physical layer device (step S1303). As described above, the microprocessor 503 generates the response packet having the acquired link information written in the predetermined location, and transmits it to the source side of trigger packet (step S1304), and thereafter switches to the normal mode (step S1305). When the trigger packet is not received (NO at step S1301), similarly the microprocessor 503 switches to the normal mode (step S1305).

In the case where a packet of illegal packet length is used as a trigger packet as shown in FIG. 7A, the trigger packet is transferred downstream in the normal mode as described below (step S1305). Accordingly, even in the case where a plurality of media converters are connected, the response test can be performed by sequentially transferring a trigger packet. On the other hand, in the case where the trigger packet as shown in FIG. 7B is used, the trigger packet is not transferred downstream because of the trigger packet addressed to the media converter itself.

Figure 14:
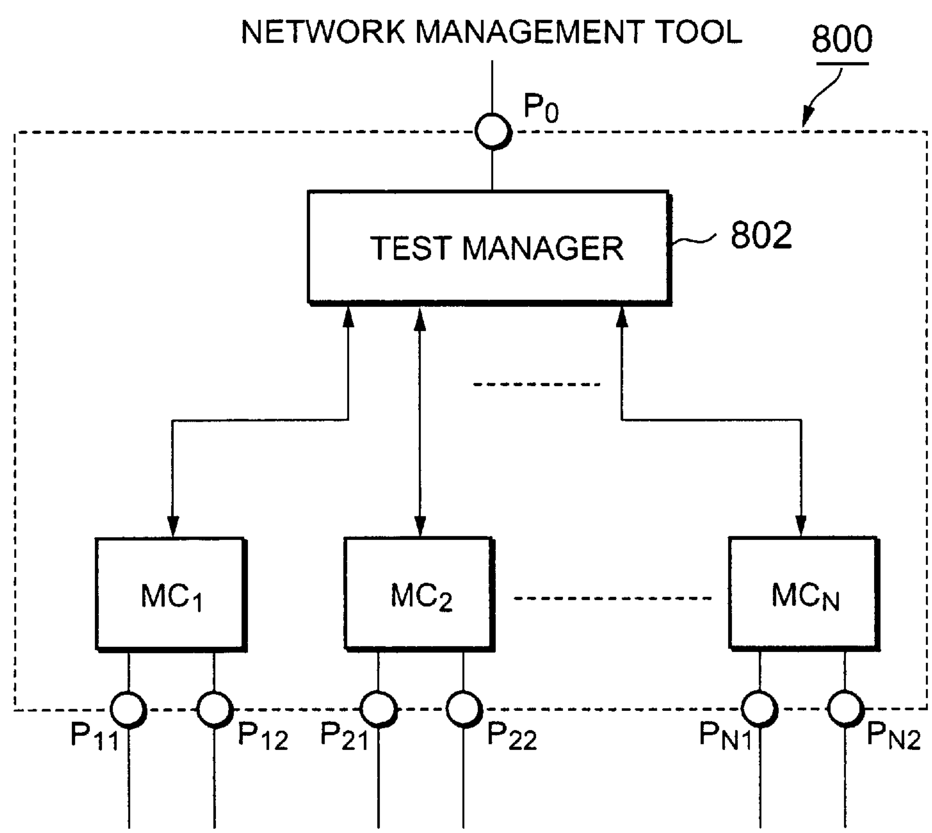
FIG. 14 is a block diagram showing a media converter with test manager according to a fourth embodiment of the present invention.

Referring to FIG. 14, a media converter with test manager 800 according to another embodiment has a port $P_0$ connected to the network management tool and N pairs of ports $P_{i1}$ and $P_{i2}$ (i=1, 2, 3, . . . , N) corresponding to N media converters $MC_1$ to MCN, respectively. The test manager 802 manages each of the media converters $MC_1$ to MCN as described above.

Failure Detecting System

A failure detecting system will be described, taking as an example the case of a trigger packet of less than 60 bytes or 1515 bytes or more as shown in FIG. 7A.

Figure 15:
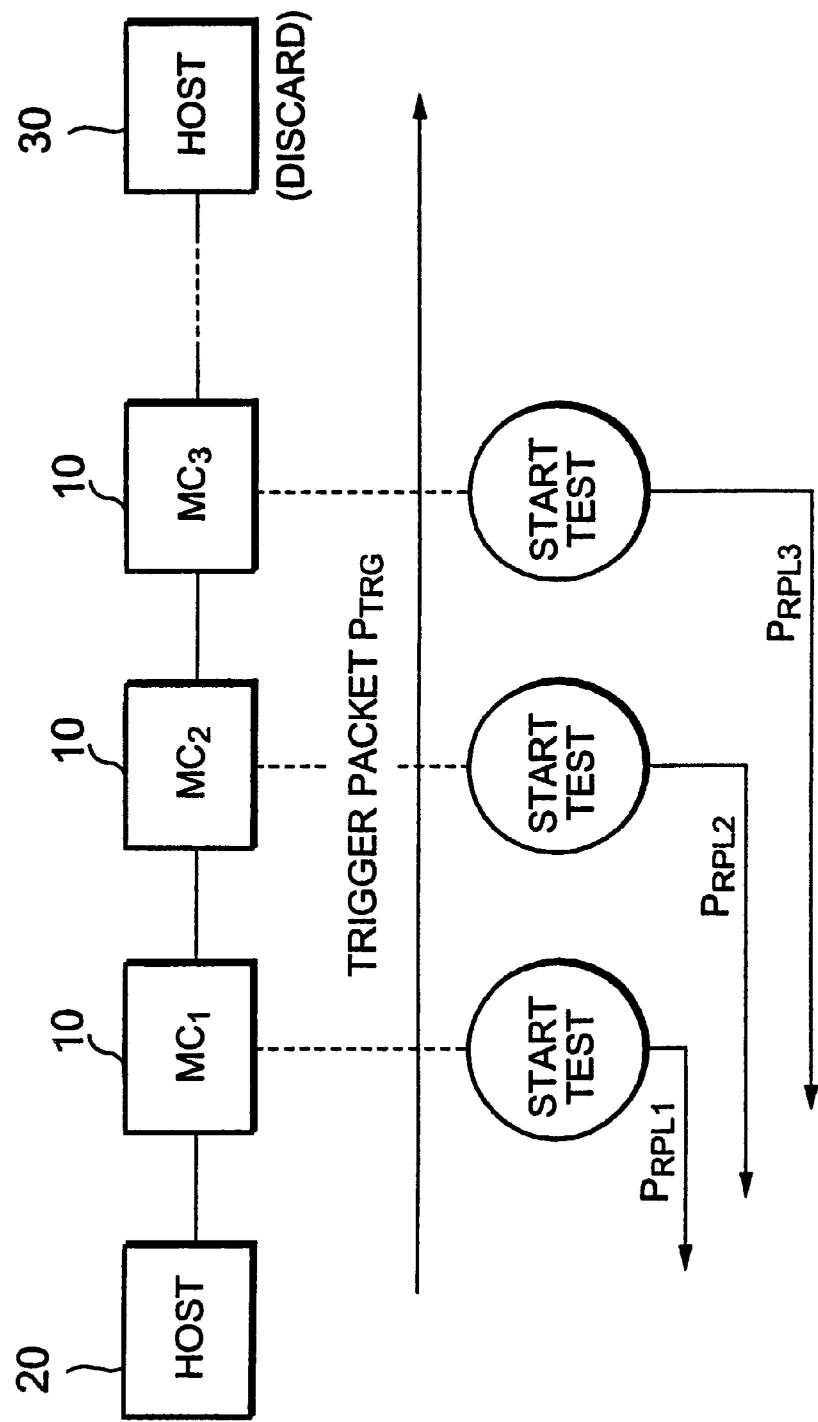
FIG. 15 is a diagram showing a network configuration for explanation of an example of response test operation using the trigger packet as shown in FIG. 7A.

Referring to FIG. 15, hosts 20 and 30 are connected by links through a plurality of media converters 10. Each of the hosts 20 and 30 has a function of detecting a trigger packet $P_{TRG}$ as shown in FIG. 7A, whose packet length is shorter or longer than standard lengths.

When the host 20 starts the test mode, as described above, a trigger packet $P_{TRG}$ is generated and transmitted. The trigger packet $P_{TRG}$ sequentially travels through the media converters 10 to the host 30. When received by the host 30, the trigger packet $P_{TRG}$ is discarded. Each of the media converters 10 having received the trigger packet $P_{TRG}$ starts the test mode, and transmits the response packet to the host 20 as described above. For example, when a media converter $MC_1$ receives the trigger packet $P_{TRG}$, it returns the response packet $P_{RPL1}$. When a media converter $MC_2$ receives the trigger packet $P_{TRG}$, it returns the response packet $P_{RPL2}$. It is the same with other media converters $MC_3$, $MC_4$ . . . .

By analyzing these response packet $P_{RPL1}$, $P_{RPL2}$ . . . that have received from the media converters $MC_1$, $MC_2$ . . . , the host 20 can monitor the status of each link or media converter. In the event that some failure has occurred, the host 20 can specify the location of occurrence of the failure based on the analyses.

Next, another failure detecting system will be described, taking as an example the case of a trigger packet as shown in FIG. 7B, wherein the MAC address of a target media converter is stored in the destination address of a trigger packet, and the address of a network management device is stored in the source address of trigger packet.

Figure 16:
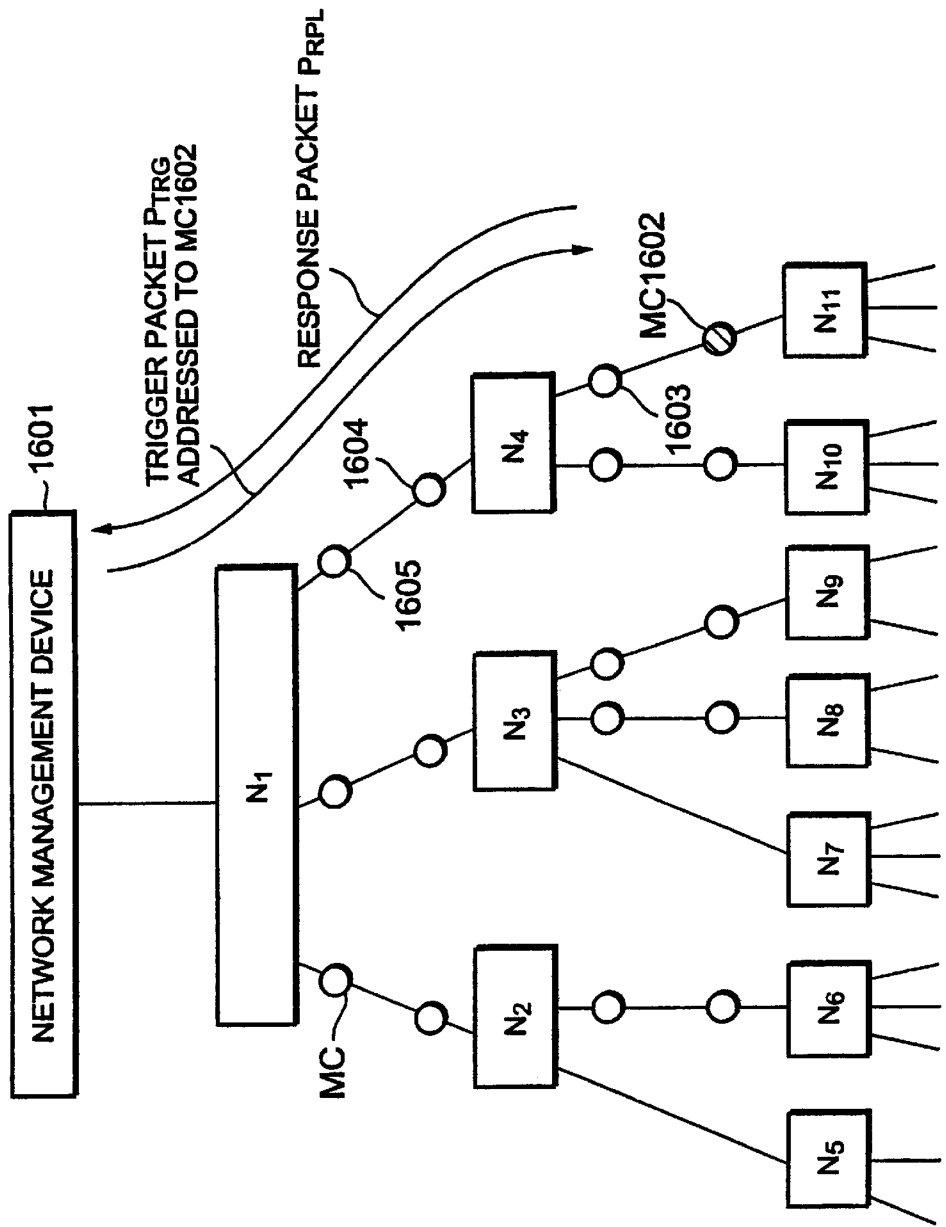
FIG. 16 is a diagram showing a network configuration for explanation of a second example of response test operation using the trigger packet shown in FIG. 7B.

Referring to FIG. 16, it is assumed that a plurality of nodes N, $N_2$ . . . are connected like a tree, and respective nodes are connected directly or through a plurality of media converters when required. MAC addresses conforming to IEEE802.3 standards are individually assigned to all of media converters MC in the network.

A network management device 1601 is connected to the node $N_1$ and is allowed to perform the response test targeted at a desired media converter using the trigger packet as shown in FIG. 7B. For example, when performing the response test targeted at the media converter 1602 connected with the node $N_{11}$, a trigger packet in which the MAC address of the media converter 1602 and the MAC address of the network management device 1601 are stored respectively in the destination address and the source address, is generated and transmitted to the network.

Each of nodes (here, $N_1$ and $N_4$) having received the trigger packet $P_{TRG}$ forwards it to an output port thereof corresponding to the destination address. In this way, the trigger packet $P_{TRG}$ travels through the nodes N, and $N_4$ to the targeted media converter 1602. Since the trigger packet does not flow through the entire network but only a required route, useless data transmission is eliminated, allowing the effective use of network.

The media converter 1602, when having received the trigger packet $P_{TRG}$, starts the test mode, and transmits the response packet $P_{RPL}$ back to the network management device 1601 as described above.

By monitoring the response packet $P_{RPL}$ received from the target media converter, the network management device 1601 can monitor the status not only of media converter 1602 but of link between 1601 and 1602. Accordingly, a plurality of media converters can be sequentially tested, and thereby the location of failure can be specified in the event that some failure has occurred.

In the case where the connection information of media converters on network are stored in the network management device 1601, the response test can be performed for each of the media converters connected to the network. For example, when the connection information is stored as path information from the network management device 1601 to the target media converter 1602 through media converters 1605, 1604, and 1603, response tests for these media converters 1605, 1604, and 1603 can be also performed sequentially while transmitting trigger packets addressed to respective ones of these media converters 1605, 1604, and 1603, and thereby the location of a failure can be specified.

As described above, by sequentially transmitting a trigger packet to plural media converters, failure detection can be made based on their response packets. Particularly, when the response packet has not been received from a certain media converter within the predetermined time, it can be determined _that a failure has occurred in more distant from this media converter. Therefore, the occurrence of a failure in a link between media converters in can be easily detected and the location of the failure can be specified to some extent.

When a trigger packet having a packet length falling out of IEEE 802.3 standards is used, only the media converter with a function for detecting this illegal packet can receive it, while other network devices discard it automatically. Therefore, the response tests of a plurality of media converters can be efficiently performed without complicated control.

By using such a trigger packet where the MAC address of a target media converter is written in a destination address field and the address of a specified management device is written in a source address thereof, the response test of the target media converter can be performed on any types of networks. Also, since switching is appropriately performed at each node along the way depending on the destination MAC address of the trigger packet, the trigger packet is not transmitted to other routes and thereby the network can be efficiently utilized, resulting in reduced traffic.

When each media converter receives a predetermined trigger packet or a trigger packet having identification data of its own, the test mode is activated to transmit the response packet back. Accordingly, the link test can be started from cable side and, when receiving the response packet from the target media converter, it can be determined that not only the link to this media converter but this media converter itself are normally operating.

Further, when each media converter receives any trigger packets other than the trigger packet addressed thereto in the status of missing link, the media converter is switched to the normal mode and thereby this received packet is transferred as it is. In this manner, since a packet which does not target this media converter for the response test is passed through, the link test can be performed more distant from there.

The media converter with test manager according to the present invention, when detecting link disconnection, starts the test mode to transmit a trigger packet. When receiving the response packet to the trigger packet, the failure detection test can be performed. Since no additional function to a management switch is required, the system structure becomes simplified.

What is claimed is:

1. A media converter for converting from one type of media to another, said media converter comprising:

- a first physical-layer interface adapted for connection to a first transmission medium;
- a second physical-layer interface adapted for connection to a second transmission medium;
- a memory connected between the first and second physical-layer interfaces, for temporarily storing data;
- a determiner for determining whether a signal received at one of the first and second physical-layer interfaces comprises one of data to be stored in the memory for transmission to the other of the first and second physical-layer interfaces and a trigger signal to activate a test mode of the media converter; and
- a controller responsive to the determiner determining that the received signal comprises data, for causing the received signal to be stored in the memory for transmission to said other of the first and second physical-layer interfaces, and responsive to the determiner determining that the received signal comprises the trigger signal, for causing a test response signal to be said one of the physical-layer interfaces back to the source that transmitted the trigger signal.

2. The media converter according to claim 1, wherein the trigger signal comprises a specified modulation link signal that is generated by modulating a normal link signal according to a predetermined modulation, and wherein the determiner comprises a detector for detecting receipt of the specified modulation link signal at said one of the first and second physical-layer interfaces.

3. The media converter according to claim 2, wherein the specified modulation link signal comprises a link sing a pulse width different from the pulse width of a normal link signal.

4. The media converter according to claim 2, wherein the specified modulation link signal comprises a link signal having an ON/OFF frequency that is different from the ON/OFF frequency of a normal link signal.

5. The media converter according to claim 2, wherein the specified modulation link signal comprises a link signal having a ratio of a pulse width to a predetermined time period that is different from the ratio of a normal link signal.

6. The media converter according to claim 2, wherein each of the first and second physical-layer interfaces supports MII conforming to IEEE802.3 standards.

7. The media converter according to claim 6, wherein the controller is responsive to receipt of the specified modulation link signal at said one of the first and second physical-layer interfaces, to access said other one of the first and second physical-layer interfaces to acquire link information from said other physical-layer interface and to generate a response signal corresponding to the link information.

8. The media converter according to claim 6, wherein the controller is responsive to a first one of the first and second physical-layer interfaces coming into link disconnection, for causing the second one of the first and second physical-layer interfaces also to come into link disconnection.

9. The media converter according to claim 8, wherein the controller is responsive to receipt of the specified modulating link signal under a missing link state, to disable the missing link state to transmit the response signal back to the source.

10. The media converter according to claim 2, wherein the response signals comprises an Ethernet packet having a predetermined format.

11. The media converter according to claim 1, wherein the trigger signal comprises an Ethernet packet having a source address field with an address of a network management device stored therein, and a destination address field with an address of the media converter itself stored therein.

12. A media converter for converting from one type of media to another said media converter comprising:

- a first physical-layer interface adapted for connection to a first transmission medium;
- a second physical-layer interface adapted for connection to a second transmission medium;
- a memory connected between the first and second physical-layer interfaces for temporarily storing data;
- a determiner for determining whether a signal received at one of the first and second physical-layer interfaces comprises one of data to be stored in the memory for transmission to the other of the first and second physical-layer interfaces and is a trigger signal to activate a test mode of the media converter; and
- a controller responsive to the determiner determining that the received signal comprises data for causing the received signal to be stored in the memory for transmission to said other of the first and second physical-layer interfaces, and responsive to the determiner determining that the received signal comprises the trigger signal, for causing a test response signal to be sent firm said one of the physical-layer interfaces back to the source that transmitted the trigger signal,
- wherein the trigger signal comprises a packet having an illegal length that is not permitted in a network to which the media converter belongs, and wherein the determiner comprises a detector for detecting an illegal-length packet.

13. A media converter for converting from one type of media to another, said media converter comprising:

- a first physical-layer interface adapted for connection to a first transmission medium;
- a second physical-layer interface adapted for connection to a second transmission medium;
- a memory connected between the first and second physical-layer interfaces, for temporarily storing data;

a determiner for determining whether a signal received at one of the first and second physical-layer interfaces comprises one of data to be stored in the memory for transmission to the other of the first and second physical-layer interfaces and is a trigger signal to activate a test mode of the media converter; and a controller responsive to the determiner determining that the received signal comprises data, for causing the received signal to be stored in the memory for transmission to said other of the first and second physical-layer interfaces, and responsive to the determiner determining that the received signal comprises the trigger signal, for causing a test response signal to be sent from said one of the physical-layer interfaces back to the source that transmitted the trigger signal wherein:

the response signals comprises an Ethernet packet having a predetermined format, and the length of the trigger signal falls out of a prescribed length range of the Ethernet packet.

14. A control method for a media converter including a first physical-layer interface to a first transmission medium; a second physical-layer interface to a second transmission medium; and a memory connected between the first and second physical-layer interfaces, the control method comprising:

determining whether a signal received at one of the first and second physical-layer interfaces contains data or comprises a trigger signal;

when the received signal contains data storing the data in the memory for transfer to the other of the first and second physical-layer interfaces, when the received signal comprises a trigger signal, generating a test response signal and transmitting the test response signal from said one of the physical-layer interfaces back to the source that transmitted the trigger signal.

15. The control method according to claim 14, wherein the trigger signals comprises a specified modulation link signal that is generated by modulating a normal link signal according to a predetermined modulation.

16. The control method according to claim 15, wherein the specified modulation link signal comprises a link signal having a pulse width different from the pulse width of a normal link signal.

17. The control method according to claim 15, wherein the specified modulation link signal comprises a link signal having an ON/OFF frequency that is different from the ON/OFF frequency of a normal link signal for a predetermined time period.

18. The control method according to claim 15, wherein the specified modulation link signal comprises a link signal having a ratio of a pulse width to a predetermined time period that is different from the ratio of a normal link signal.

19. The control method according to claim 15, wherein each of the first and second physical-layer interfaces supports MII conforming to IEEE802.3 standards.

20. The control method according to claim 19, wherein the test response signal is generated by:

accessing the other one of the first and second physical-layer interfaces to acquire link information; and generating the test response signal to correspond to the acquired link information.

21. The control method according to claim 19, wherein the tests response signal is transmitted by:

determining whether the media converter is in a missing link state such that, when one of the first and second physical-layer interfaces comes into link disconnection, the other one of the first and second physical-layer interfaces also comes into link disconnection; and when the specified modulation link signal is received in the missing link state, disabling the missing link state to transmit the test response signal from the corresponding physical-layer interface to the source.

22. A method for detecting a failure on a link through a plurality of media converters, the media converters connecting different types of media, said method comprising:

transmitting a special data block to each of the plurality of media converters, the special data block having an illegal block length;

determining whether a response data block corresponding to the special data block is received from each of the plurality of media converters within a predetermined time period; and detecting a location of a failure based on the determination result.

23. The method according to claim 22, wherein, when it is determined that a response data block corresponding to the special data block is not received from a corresponding media converter within the predetermined time period, it is detected that a failure has occurred at a location beyond the corresponding media converter.

24. The method according to claim 22, wherein each of the plurality of media converters a first physical-layer interface to a first transmission medium; a second physical-layer interface to a second transmission medium; and a memory connected between the first and second physical-layer interfaces, for temporarily storing data to be transferred between the first and second physical-layer interfaces, the method further comprising at each of the plurality of media converters:

determining whether a received data block comprises a normal data block or the special data block;

when it is determined that the received data block comprises the special data block, generating a response data block corresponding to the special data block; and transmitting the response data block from a corresponding one of the first and second physical-layer interfaces back to the source that has transmitted the received data block.

25. The method according to claim 24, wherein each of the first and second physical-layer interfaces supports MII (Media Dedicated Interface) conforming to IEEE802.3 standards.

26. The method according to claim 25, wherein generating the response data block comprises:

accessing the other one of the fist and second physical-layer interfaces to acquire link information; and generating the response data block to correspond to the acquired link information.

27. The method according to claim 22, further comprising at each of the plurality of media converters:

determining whether a received data block stored in the memory comprises the special data block;

when it is determined that the received data block comprises the special data block, generating a response data block corresponding to the received data block;

disabling a missing link state such that, when one of the first and second physical-layer interfaces comes into link disconnection, the other one of the first and second physical-layer interfaces also comes into link disconnection; and transmitting the response data block back to the source of the received data block.

28. The method according to claim 27, wherein, when it is determined that the received data block comprises the special data block under the missing link state, a corresponding media converter disables the missing link state and transmits the received data block downstream.

29. A failure detection system comprising:

a plurality of media converters;

a link through the plurality of media converters; and a test manager connected to one of the media converters; wherein:

each of the media converters comprises:

a first physical-layer interface adapted for connection to a first transmission medium;

a second physical-layer interface adapted for connection to a second transmission medium;

a memory connected between the first and second physical-layer interfaces; and a media converter controller, said media converter controller responsive to a signal received from one of the first and second physical-layer interfaces containing data, to cause the received signal to be stored in the memory for transmission to the other of the first and second physical-layer interfaces, and responsive to the received signals comprising a trigger signal, to cause a test response signal to be generated, and to cause the test response signal to be transmitted from the one of the physical-layer interfaces back to the source that transmitted the trigger signal, wherein:

the test manager comprises a test manager controller for transmitting a special data block to the link through the media converter connected to the test manager, determining whether a response data block is received from each of the media converters within a predetermined time period; and detecting a location of a failure based on whether the response data block is received from each of the media converters within the predetermined time period.

30. The failure detection system according to claim 29, wherein the test manager is responsive to the response data block not being received from a particular media converter within the predetermined time period, to determine that a failure has occurred at a location beyond the particular media converter.

31. A method of detecting that a failure has occurred at an identified one of a plurality of media converters included in a network, the method comprising:

transmitting a trigger data block having a destination address field and a source address field, and having an address of the identified media converter stored in the destination address field and an address of a predetermined management device stored in the source address field;

determining whether a response data block corresponding to the trigger data block is received from the identified media converter within a predetermined time period; and detecting a failure at the identified media converter based on the determination result.

32. The method according to claim 31, wherein, the failure is detected when the response data block is not received from the identified media converter within the predetermined time period.

33. The method according to claim 31, wherein each of the media converters comprises a first physical-layer interface to a first transmission medium; a second physical-layer interface to a second transmission medium; and a memory connected between the first and second physical-layer interfaces, the method further comprising at each of the media converters:

determining whether a data block received at one of the first and second physical-layer interfaces comprises a normal data block or the trigger data block;

when the received data block comprises a normal data block, storing the data block in the memory for transfer to the other of the first and second physical-layer interfaces;

when it is determined that the received data block comprises the trigger data block, generating a response data block corresponding to the trigger data block; and transmitting the response data block from said one of the first and second physical-layer interfaces back to the source that has transmitted the trigger data block.

34. The method according to claim 33, wherein each of the first and second physical-layer interfaces supports MII conforming to IEEE802.3 standards.

35. The method according to claim 34, wherein generating the response data block comprises:

accessing said other one of the first and second physical-layer interfaces to acquire link information; and generating the response data block to correspond to the link information.

36. The method according to claim 31, wherein further comprising at each of the plurality of media converters:

determining whether a received data block stored in the memory comprises the trigger data block or not;

when it is determined that the received data block comprises the trigger data block, generating a response data block corresponding to the received data block;

disabling a missing link state such that, when one of the first and second physical-layer interfaces comes into link disconnection, the other one of the first and second physical-layer interfaces also comes into link disconnection; and transmitting the response data block back to the source of the trigger data block.

37. The method according to claim 36, wherein, when it is determined that the received data block comprises the trigger data block under the missing link state, a corresponding media converter disables the missing link state and transmits the received data block downstream.

38. A failure detection system in a network including a plurality of media converters and a management device, wherein:

each of the media converters comprises:

a first physical-layer interface to a first transmission medium of the network;

a second physical-layer interface to a second transmission medium of the network;

a memory connected between the first and second physical-layer interfaces, for temporarily storing data to be transferred between the first and second physical-layer interfaces; and a media converter controller responsive to a data block received from one of the first physical-layer interface and the second physical-layer interface being a trigger data block having a destination address field with an address of an arbitrary media converter stored therein and a source address field with an address of the management device stored therein, for generating a response data block corresponding to the trigger block, and transmitting the response data block from said one of the first and second physical-layer interfaces back to the source that has transmitted the trigger data block, and the management device determines whether a response data block to the trigger data block is received from the arbitrary media converter within a predetermined time period, and detects a location of a failure based on whether the response data block is received from the arbitrary media converter within the predetermined time period.

39. The system according to claim 38, wherein the management device includes link information of the media converters in the network, and transmits a trigger data block to each of the media converters on a path from the management device to each media converter to perform a response test, and wherein the trigger data block has an address of each of the media converters on the path stored in the destination address field thereof.

40. A media converter for converting from one type of media to another, said media converter comprising:

a first physical-layer interface adapted for connection to a first transmission medium;

a second physical-layer interface adapted for connection to a second transmission medium;

a memory connected between the first and second physical-layer interfaces, for temporarily storing data received in a signal from one of the first and second physical-layer interfaces; and a controller responsive to the received signal containing data, for causing the data to be stored in the memory for transmission to the other of the first and second physical-layer interfaces, and responsive to the received signal comprising a trigger signal, for causing a test response signal to be sent from said one of the physical-layer interfaces back to the source that transmitted the trigger signal.

41. The media converter according to claim 40, wherein the trigger signal comprises a specified modulation link signal that is generated by modulating a normal link signal according to a predetermined modulation.

42. The media converter according to claim 41, wherein the specified modulation link signal comprises a link signal having a pulse width different from the pulse width of a normal link signal.

43. The media converter according to claim 41, wherein the specified modulation link signal comprises a link signal having an ON/OFF frequency that is different from the ON/OFF frequency of a normal link signal.

44. The media converter according to claim 41, wherein the specified modulation link signal comprises a link signal having a ratio of a pulse width to a predetermined time period that is different from the ratio of a normal link signal.

45. The media converter according to claim 41, wherein each of the first and second physical-layer interfaces supports MN conforming to IEEE802.3 standards.

46. The media converter according to claim 45, wherein the controller is responsive to receipt of the specified modulation link signal at one of the first and second physical-layer interfaces, to access the other one of the first and second physical-layer interfaces to acquire link information from the other one of the physical-layer interfaces and to generate a response signal corresponding to the link information.

47. The media converter according to claim 45, wherein the controller is responsive to a first one of the first and second physical-layer interfaces coming into link disconnection, for causing the second one of the first and second physical-layer interfaces also to come into link disconnection.

48. The media converter according to claim 47, wherein the controller is responsive to receipt of the specified modulating link signal under a missing link state, to disable the missing link state to transmit the response signal back to the source.

49. The media converter according to claim 41, wherein the response signal comprises an Ethernet packet having a predetermined format.

50. The media converter according to claim 49, wherein the response signal comprises an Ethernet packet, and wherein the length of the trigger signal falls out of a prescribed length range of the Ethernet packet.

51. The media converter according to claim 40, wherein the trigger signal comprises a packet having an illegal length that is not permitted in a network to which the media converter belongs, and wherein the determiner comprises a detector for detecting an illegal-length packet.

52. The media converter according to claim 40, wherein the trigger signal comprises an Ethernet packet having a source address field with an address of a network management device stored therein, and a destination address field with an address of the media converter itself stored therein.

* * * * *